US012803302B2

(12) United States Patent
Zhou et al.

(10) Patent No.: US 12,803,302 B2
(45) Date of Patent: Nov. 17, 2026

(54) POWER SUPPLY SYSTEM AND METHOD OF OPERATING POWER SUPPLY SYSTEM

(71) Applicant: Infineon Technologies AG, Neubiberg (DE)

(72) Inventors: Ming Zhou, Shenzhen (CN); Pradip Chatterjee, Soest (DE); Song Shen, Shenzhen (CN); Lifeng Chen, Shanghai (CN)

(73) Assignee: Infineon Technologies AG, Neubiberg (DE)

( * ) Notice: Subject to any disclaimer, the term of this patent is extended or adjusted under 35 U.S.C. 154(b) by 919 days.

(21) Appl. No.: 18/170,274

(22) Filed: Feb. 16, 2023

(65) Prior Publication Data

US 2023/0261486 A1 Aug. 17, 2023

(30) Foreign Application Priority Data

Feb. 17, 2022 (CN) ........................ 202210147634.4

(51) Int. Cl.
*H02J 7/50* (2026.01)
*G06F 1/26* (2006.01)
(Continued)

(52) U.S. Cl.
CPC .............. *H02J 7/575* (2026.01); *G06F 1/263* (2013.01); *G06F 1/30* (2013.01); *H02J 7/02* (2013.01);
(Continued)

(58) Field of Classification Search
CPC .... G06F 1/263; G06F 1/30; H02J 7/02; H02J 7/575; H02J 7/685; H02J 7/865; H02J 9/06
(Continued)

(56) References Cited

U.S. PATENT DOCUMENTS 6,295,215 B1 * 9/2001 Faria ...................... H02J 9/062 363/124
10,069,434 B2 9/2018 Wang
(Continued)

FOREIGN PATENT DOCUMENTS

CN 201349143 Y 11/2009
CN 104092277 A 10/2014
(Continued)

*Primary Examiner* — Julian D Huffman
*Assistant Examiner* — Ryu-Sung P. Weinmann
(74) *Attorney, Agent, or Firm* — Harrity & Harrity, LLP

(57) ABSTRACT

A power supply system includes an input terminal receiving an alternating current input; an output terminal connected to a load; a first switch, a second switch and a third switch; a rectification and charging-discharging module with one end coupled to the input terminal through the first switch and coupled to a battery through the third switch; a conversion module with one end coupled to the other end of the rectification and charging-discharging module via a direct current bus, and the other end coupled to the output terminal; and a bypass module with one end coupled to the input terminal, and the other end coupled to the output terminal through the second switch. The power supply system operates in one of a line mode, a battery mode or an alternating current out of limit mode by switching the first switch, the second switch, and the third switch on or off.

24 Claims, 31 Drawing Sheets

(51) Int. Cl.
*G06F 1/30* (2006.01)
*H02J 7/02* (2016.01)
*H02J 7/60* (2026.01)
*H02J 9/06* (2006.01)

(52) U.S. Cl.
CPC ................ *H02J 7/685* (2026.01); *H02J 9/06* (2013.01); *H02J 9/062* (2013.01)

(58) Field of Classification Search
USPC .................................................. 320/108, 107
See application file for complete search history.

(56) References Cited

U.S. PATENT DOCUMENTS

| | | | | |
|---|---|---|---|---|
| 10,250,057 | B2 | 4/2019 | Zhao et al. | |
| 2009/0256422 | A1* | 10/2009 | Fox | H02J 9/062 307/23 |
| 2010/0127569 | A1* | 5/2010 | Dai | H02J 9/061 307/64 |
| 2010/0225170 | A1* | 9/2010 | Hjort | H02J 9/062 307/65 |
| 2011/0278934 | A1* | 11/2011 | Ghosh | H02M 7/493 307/66 |
| 2021/0194277 | A1 | 6/2021 | Ho et al. | |

FOREIGN PATENT DOCUMENTS

| | | | |
|---|---|---|---|
| CN | 106356984 | A | 1/2017 |
| CN | 212695761 | U | 3/2021 |
| CN | 113675939 | A | 11/2021 |

* cited by examiner

POWER SUPPLY SYSTEM AND METHOD OF OPERATING POWER SUPPLY SYSTEM

CROSS REFERENCE TO RELATED APPLICATION

This application claims priority to China Patent Application No. 202210147634.4 filed on Feb. 17, 2022, the content of which is incorporated by reference herein in its entirety.

TECHNICAL FIELD

The present disclosure relates to the field of electronic circuits, and in particular to UPS (Uninterruptible Power Supply).

BACKGROUND

UPS is capable of continuously providing a spare alternating current power supply for a load in case of abnormal power grid to maintain a normal operation of the load. UPS is widely used in digital world, including but not limited to a computer, a data center, a telecommunications device or other electronic device.

FIG. 1A shows a block diagram of a conventional UPS device. As shown in FIG. 1A, the UPS device includes an AC (alternating current)-to-DC (direct current) PFC (power factor correction) rectification module 1, a bypass module 2, a DC-to-AC inverter module 3, a battery BAT, a DC-to-DC battery charging-discharging module 4, a detection circuit 5, switches S11 and S12, and a micro control unit MCU. An AC input is connected to the rectification module 1 through the switch S11. The rectification module 1 is connected to the inverter module 3 and the battery charging-discharging module 4 via a DC (direct current) bus, and the bypass module 2 is connected to an output of the UPS device through the switch S12. The detection circuit 5 detects a voltage/current/frequency of an input terminal and/or an output terminal of the UPS device. A MCU receives a sampling signal of the voltage/current/frequency from the detection circuit 5 and transmits a switch device and relay control signal based on the sampling signal.

The traditional UPS shown in FIG. 1A generally has two operating modes. A first mode refers to mains power input and inverter output, wherein the battery is charged via the DC bus. A second mode refers to a battery mode, that is, the battery discharges via the DC bus, and inverter output.

In order to improve efficiency, power may be supplied to the load through the bypass module 2 instead of the rectifier module 1 and the inverter module 3 in a case that the mains power input meets a load demand.

FIG. 1B shows an arrangement of FIGS. 1C and 1D, which are conjoined as shown in FIG. 1B.

FIGS. 1C and 1D, as combined according to FIG. 1B, show the detailed circuit diagram of the UPS device shown in FIG. 1A. Thus, FIGS. 1C and 1D each show a portion of a detailed circuit diagram of the UPS device shown in FIG. 1A.

For simplicity, FIGS. 1C and 1D do not show circuit structures of the detection circuit 5 and the MCU.

As shown in FIGS. 1C and 1D, the rectification module 1 includes three switch units that are respectively connected to three phases of the three-phase AC input. Each switch unit includes two transistors that are connected in series and two diodes that are connected in series. The Bypass module 2 includes three pairs of reverse parallel thyristor Bypass_a, Bypass_b, and Bypass_c that are respectively connected to the three phases. The inverter module 3 includes three switch units. Each of the switch units includes four transistors in series and two diodes in series, and is connected to a corresponding switch unit of the rectification module 1 via the DC bus. The battery charging-discharging module 4 includes four transistors connected in series, and the battery is coupled between the first transistor and the fourth transistor.

SUMMARY

A brief overview of the present disclosure is given below in order to provide a basic understanding of certain aspects of the present disclosure. It should be understood that the overview is not an exhaustive overview about the contents of the present disclosure. The overview is not intended to determine a key or important part of the present disclosure or intended to limit the scope of the present disclosure. A purpose is only to give some concepts in a simplified form as a prelude to a more detailed description to be discussed later.

According to an aspect of the present disclosure, a power supply system is provided. The power supply system includes an input terminal receiving an alternating current input; an output terminal connected to a load; a first switch, a second switch and a third switch; a rectification and charging-discharging module with one end coupled to the input terminal through the first switch and coupled to a battery through the third switch; a conversion module with one end coupled to the other end of the rectification and charging-discharging module via a direct current bus, and the other end coupled to the output terminal; and a bypass module with one end coupled to the input terminal, and the other end coupled to the output terminal through the second switch. The power supply system operates in one of a line mode, a battery mode and an AC out of limit mode by switching the first switch, the second switch and the third switch on or off.

Preferably, in the line mode, the first switch is switched off, and the second switch and the third switch are switched on. In the battery mode, the first switch and the second switch are switched off, and the third switch is switched on. In the AC out of limit mode, the first switch is switched on, and the second switch and the third switch are switched off.

Preferably, in the line mode, the bypass module operates and supplies power to the load; the conversion module rectifies an alternating current or voltage received from the bypass module and charges the DC bus; and the DC bus charges the battery through the rectification and charging-discharging module. In the battery mode, the bypass module does not operates; the rectification and charging-discharging module discharges the battery; and the conversion module converts a direct current or voltage received from the rectification and charging-discharging module into an alternating current or voltage. In the AC out of limit mode, the bypass module does not operate; the rectification and charging-discharging module rectifies an alternating current or voltage received via the input terminal; and the conversion module converts a direct current or voltage received from the rectification and charging-discharging module into an alternating current or voltage.

Preferably, the rectification and charging-discharging module includes two switch units between which the battery is coupled. The conversion module includes two switch units coupled, respectively, to the two switch units of the rectification and charging-discharging module.

Preferably, in the line mode and the battery mode, the two switch units of the rectification and charging-discharging module are coupled between one of a positive electrode and a negative electrode of the battery and the direct current bus, respectively. In the AC out of limit mode, the two switch units of the rectification and charging-discharging module are connected in parallel.

Preferably, each of the two switch units of the rectification and charging-discharging module includes three transistors and one diode. A second transistor and a third transistor of the three transistors are connected in reverse series. One end of a first transistor of the three transistors and one end of the diode are connected to the second transistor. The other end of the first transistor and the other end of the diode are connected to the DC bus. The positive electrode and the negative electrode of the battery are respectively coupled to a cathode of the diode of one of the two switch units of the rectification and charging-discharging module and an anode of the diode of the other one of the two switch units of the rectification and charging-discharging module.

Preferably, each of the two switching units of the rectification and charging-discharging module includes four transistors and two diodes. A first transistor, a second transistor and a third transistor of the four transistors and a first diode of the two diodes are connected in series. A fourth transistor of the four transistors and a second diode of the two diodes are connected in series and connected in parallel with the second transistor and the third transistor. The positive electrode and the negative electrode of the battery are respectively coupled between a cathode of the second diode of one of the two switch units of the rectification and charging-discharging module and an anode of the second diode of the other one of the two switch units of the rectification and charging-discharging module.

Preferably, each of the two switch units of the rectification and charging-discharging module includes three transistors and three diodes. A first transistor, a second transistor and a third transistor among the three transistors and a first diode of the three diodes are connected in series. A second diode and a third diode of the three diodes are connected in series and connected in parallel with the second transistor and the third transistor. The positive electrode and the negative electrode of the battery are respectively coupled between an intermediate node between the second transistor and the third transistor of one of the two switch units of the rectification and charging-discharging module and an intermediate node between the second transistor and the third transistor of the other one of the two switch units of the rectification and charging-discharging module.

Preferably, each of the two switch units of the rectification and charging-discharging module includes two transistors connected in series. The battery is coupled between an intermediate node between respective two transistors of the two switch units of the rectification and charging-discharging module.

Preferably, each of the two switch units of the rectification and charging-discharging module includes a transistor and a diode connected in series. A positive electrode and a negative electrode of the battery are coupled, respectively, between a cathode of the diode of one of the two switch units of the rectifier and charging-discharging module and an anode of the diode of the other one of the two switch units of the rectifier and charging-discharging module.

Preferably, the rectification and charging-discharging module includes a first switch unit, a second switch unit and a third switch unit that are connected, respectively, to three phases of the alternating current input. The conversion module includes three switch units. The three switch units are coupled, respectively, to the first switch unit, the second switch unit and the third switch unit of the rectification and charging-discharging module via the DC bus. The bypass module includes three switches that are connected, respectively, to the three phases.

Preferably, the power supply system further includes a fourth switch. The positive electrode of the battery is coupled between the two switch units of the rectification and charging-discharging module through the third switch and the negative electrode of the battery is coupled between the two switch units of the rectification and charging-discharging module through the fourth switch.

Preferably, each of the first switch unit and the second switch unit includes three transistors and one diode. A second transistor and a third transistor of the three transistors are connected in reverse series. One end of a first transistor of the three transistors and one end of the diode are connected to the second transistor. The other end of the first transistor and the other end of the diode are connected to the DC bus. The positive electrode of the battery is coupled to a cathode of the diode of one of the first switch unit and the second switch unit, and the negative electrode of the battery is coupled to an anode of the diode of the other one of the first switch unit and the second switch unit. The third switch unit includes two transistors connected in reverse series, and two diodes. One end of each of the diode is connected to the two transistors and the other end is connected to the DC bus.

Preferably, each of the first switch unit and the second switch unit includes four transistors and two diodes. A first transistor, a second transistor and a third transistor of the four transistors and a first diode of the two diodes are connected in series. A fourth transistor of the four transistors and a second diode of the two diodes are connected in series and connected in parallel with the second transistor and the third transistor. The positive electrode of the battery is coupled to a cathode of the diode of one of the first switch unit and the second switch unit, and the negative electrode of the battery is coupled to an anode of the diode of the other one of the first switch unit and the second switch unit. The third switch unit includes two transistors and four diodes. The two transistors and a first diode and a second diode of the four diodes are connected in series and connected in parallel with a third diode and a fourth diode that are connected in series.

Preferably, each of the first switch unit and the second switch unit includes three transistors and three diodes. A first transistor, a second transistor and a third transistor of the three transistors and a first diode among the three diodes are connected in series. A second diode and a third diode of the three diodes are connected in series and connected in parallel with the second transistor and the third transistor. The positive electrode and the negative electrode of the battery are coupled between intermediate nodes between the respective second and the third transistors of the first switch unit and the second switch unit. The third switch unit includes two transistors and four diodes. The two transistors and a first diode and a second diode of the four diodes are connected in series and connected in parallel with a third diode and a fourth diode.

Preferably, each of the first switch unit, the second switch unit and the third switch unit includes two transistors connected in series. The battery is coupled between an intermediate node between the two transistors of the first switch unit and an intermediate node between the two transistors of the second switch unit.

Optionally, each of the first switch unit and the second switch unit includes a transistor and a diode connected in series. The third switch unit includes two diodes connected in series. The positive electrode of the battery is coupled to a cathode of the diode of one of the first switch unit and the second switch unit, and the negative electrode of the battery is coupled to an anode of the diode of the other one of the first switch unit and the second switch unit.

Preferably, the first switch unit is connected to a first phase of the three phases of the alternating current input. The second switch unit is connected to a second phase of the three phases. The third switch unit is connected to a third phase of the three phases. The rectification and charging-discharging module further includes a fourth switch unit connected to the first phase, a fifth switch unit connected to the second phase, and a sixth switch unit connected to the third phase. The power supply system includes three batteries. A first battery of the three batteries is coupled between the first switch unit and the fourth switch unit or the fifth switch unit. A second battery of the three batteries is coupled between the second switch unit and the fifth switch unit or the sixth switch unit. A third battery of the three batteries is coupled between the third switch unit and the sixth switch unit or the fourth switch unit. The conversion module further includes three further switch units respectively coupled to the fourth switch unit, the fifth switch unit and the sixth switch unit of the rectification and charging-discharging module via the DC bus.

Preferably, each of the three switches of the bypass module includes two thyristors connected in reverse parallel.

Preferably, the power supply system further includes a controller. The controller is configured to detect at least one of a voltage, a current, and a frequency at the input terminal and/or the output terminal to provide the power supply system with a control signal for switching corresponding switches and transistors in the power supply system on or off. The control signal causes the power supply system to switch over among the line mode, the battery mode and the AC out of limit mode.

According to another aspect of the present disclosure, a method of operating the power supply system is provided. The method includes: detecting at least one of a voltage, a current and a frequency at the input terminal and/or output terminal of the power supply system; determining that the power supply system operates in one of the line mode, the battery mode and the alternating current out of limit mode based on at least one of the detected voltage, current and frequency; providing the power supply system with a control signal for switching off the first switch and switching on the second switch and the third switch, in a case of determining that the power supply system operates in the line mode; providing the power supply system with a control signal for switching off the first switch and the second switch and switching on the third switch, in a case of determining that the power supply system operates in the battery mode; and providing the power supply system with a control signal for switching on the first switch and switching off the second switch and the third switch, in a case of determining that the power supply system operates in the alternating current out of limit mode.

Through the power supply system according to the present disclosure, a total number of switch devices and inductors is reduced and an overall structure is simplified.

These and other advantages of the present disclosure will be more obvious through the following detailed description of the preferred implementations of the present disclosure in combination with the drawings.

BRIEF DESCRIPTION OF THE DRAWINGS

To further set forth the above and other advantages and features of the present disclosure, detailed description of the implementations of the present disclosure will be made in the following in conjunction with the drawings. The drawings, together with the detailed description below, are incorporated into and form a part of the specification. Elements with the same functions and structures are indicated by the same reference mark. It should be understood that the drawings only illustrate typical implementations of the present disclosure and should not be construed as a limitation to the scope of the present disclosure. In the drawings:

FIG. 10E and FIG. 10F show a detailed circuit diagram of a power supply system in an AC out of limit mode;

DETAILED DESCRIPTION

Figure 1A:
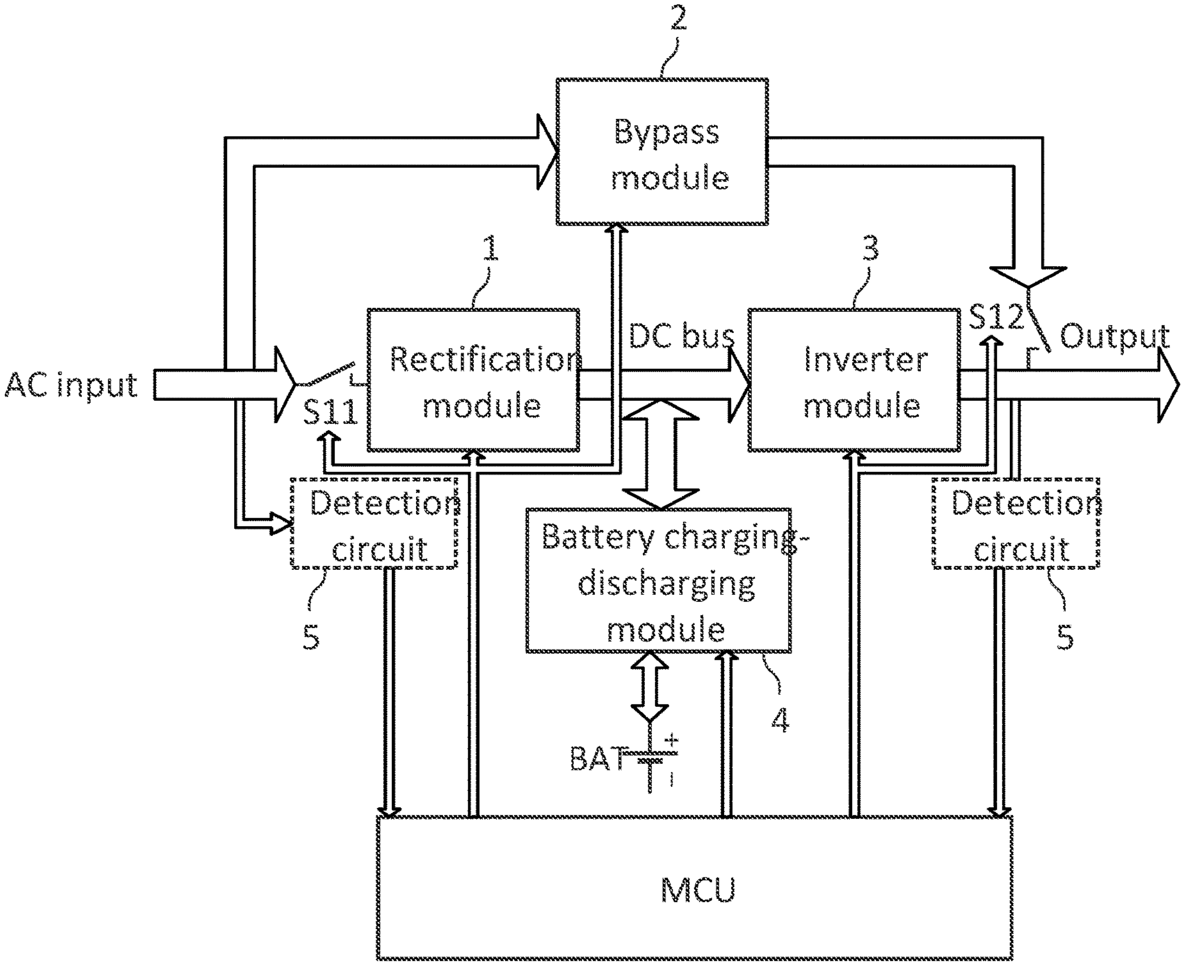
FIG. 1A is a block diagram of a conventional UPS device.
Figure 1B:
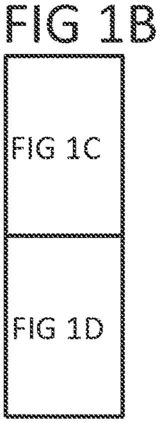
FIG. 1B shows an arrangement of FIGS. 1C and 1D, which are conjoined as shown in FIG. 1B.

Example implementations of the present disclosure are described below in conjunction with the drawings. For conciseness and clarity, not all features of an actual implementation are described in this specification. However, it should be understood that numerous implementation-specific decisions, for example, in accord with constraining conditions related to system and business, should be made when developing any of such actual implementations, so as to achieve specific targets of a developer. These constraining conditions may vary with different implementations. Furthermore, it should be understood that although development work may be complicated and time-consuming, for those skilled in the art benefiting from the present disclosure, such development work is only a routine task.

Here, it should further be noted that in order to avoid obscuring the present disclosure due to unnecessary details, only a device structure and/or processing step closely related to the solutions according to the present disclosure are illustrated in the drawings, and other details less related to the present disclosure are omitted.

A power supply system 200 according to an implementation of the present disclosure is described below with reference to FIG. 2. In this implementation, the power supply system 200 is, for example (but not limited to), a UPS device.

Figure 2:
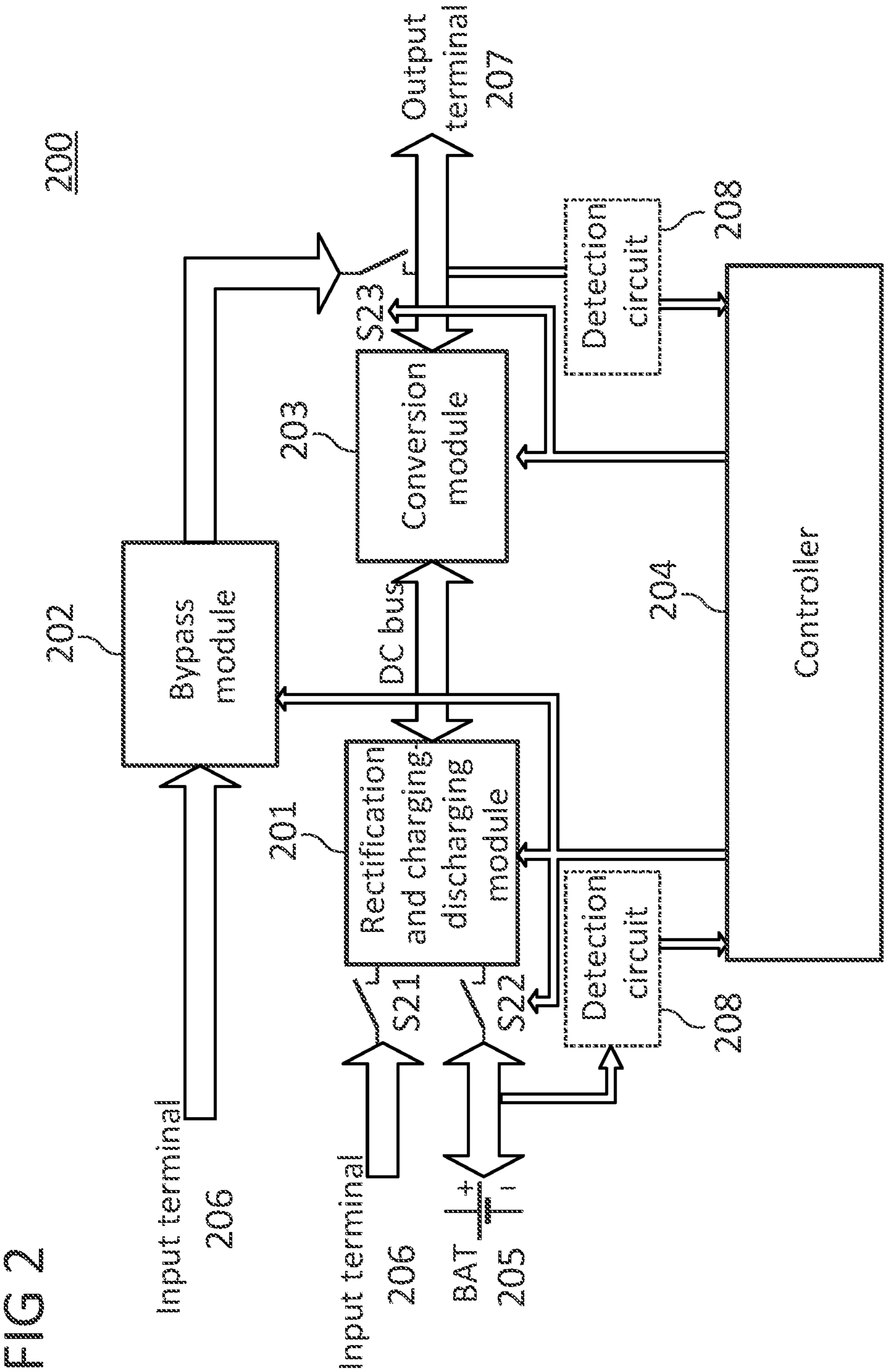
FIG. 2 is a schematic block diagram of a power supply system according to an implementation of the present disclosure.

As shown in FIG. 2, the power supply system 200 includes a rectification and charging-discharging module 201, a bypass module 202, a conversion module 203, a controller 204, a battery 205, a detection circuit 208, switches S21, S22, S23, an input terminal 206, and an output terminal 207. One end of the rectification and charging-discharging module 201 is coupled to the input terminal 206 through the switch S21 and coupled to the battery 205 through the switch S22. One end of the conversion module 203 is coupled to the other end of the rectification and charging-discharging module 201 via a DC bus, and the other end of the conversion module 203 is coupled to the output terminal 207. The bypass module 202 is coupled to the input terminal 206 at one end and coupled to the output terminal 207 through the switch S23 at the other end. The input terminal 206 receives an AC input, and the output terminal 207 is connected to a load (not shown).

In the power supply system 200 shown in FIG. 2, the detection circuit 208 detects a voltage/current/frequency at the input terminal 206 and/or the output terminal 207. The controller 204 receives a sampling signal of the voltage/current/frequency from the detection circuit 208, determine an operation mode of the power supply system 200 based on the sampling signal, and transmit a corresponding control signal to corresponding switches and transistors based on the determined operation mode.

For example, the controller 204 determines that the power supply system 200 operates in a line mode in a case that the AC input meets a load power supply requirement or a specification of the power supply system.

For example, in the absence of the AC input, the controller 204 determines that the power supply system 200 operates in the battery mode.

For example, the controller 204 determines that the power supply system 200 operates in the AC out of limit mode in a case that the AC input does not meet a load power supply requirement.

In a case that the controller 204 determines that the power supply system 200 operates in one of the line mode, the battery mode and the AC out of limit mode, the switches S21, S22 and S23 are switched on or off based on a control signal transmitted by the controller 204.

More particularly, in this implementation, in the line mode, the switch S21 is switched off, and switches S22 and S23 are switched on. In this case, the bypass module 202 operates. The conversion module 203 rectifies an AC current or voltage received from the bypass module 202 and charges the DC bus (for example, through a capacitor), and the DC bus charges the battery 205 through the rectification and charging-discharging module 201.

In the battery mode, switches S21 and S23 are switched off and the switch S22 is switched on. In this case, the bypass module 202 does not operate. The rectification and charging-discharging module 201 discharges the battery 205, and the conversion module 203 converts a DC current or voltage received from the rectification and charging-discharging module 201 into an AC current or voltage.

In the AC out of limit mode, the switch S21 is switched on, and switches S22 and S23 are switched off. In this case, the bypass module 202 does not operate. The rectification and charging-discharging module 201 rectifies an AC current or voltage received via the input terminal 206, and the conversion module 203 converts a DC current or voltage received from the rectification and charging-discharging module 201 into an AC current or voltage.

Compared with the conventional UPS device in FIG. 1A, through the power supply system 200 according to this implementation, a total number of switch devices and inductors is reduced and an overall structure is simplified.

Implementations of detailed circuit structures of the power supply system 200 in FIG. 2 are described below with reference to FIG. 3 to FIG. 11B.

It should be noted that the controller 204 and the detection circuit 208 in the power supply system 200 shown in FIG. 2 may be implemented in any appropriate existing way. For brevity, detailed circuit structures of the controller 204 and the detection circuit 208 are omitted in FIG. 3 to FIG. 11B, and detailed description of the controller 204 and the detection circuit 208 is also omitted below.

Figure 3:
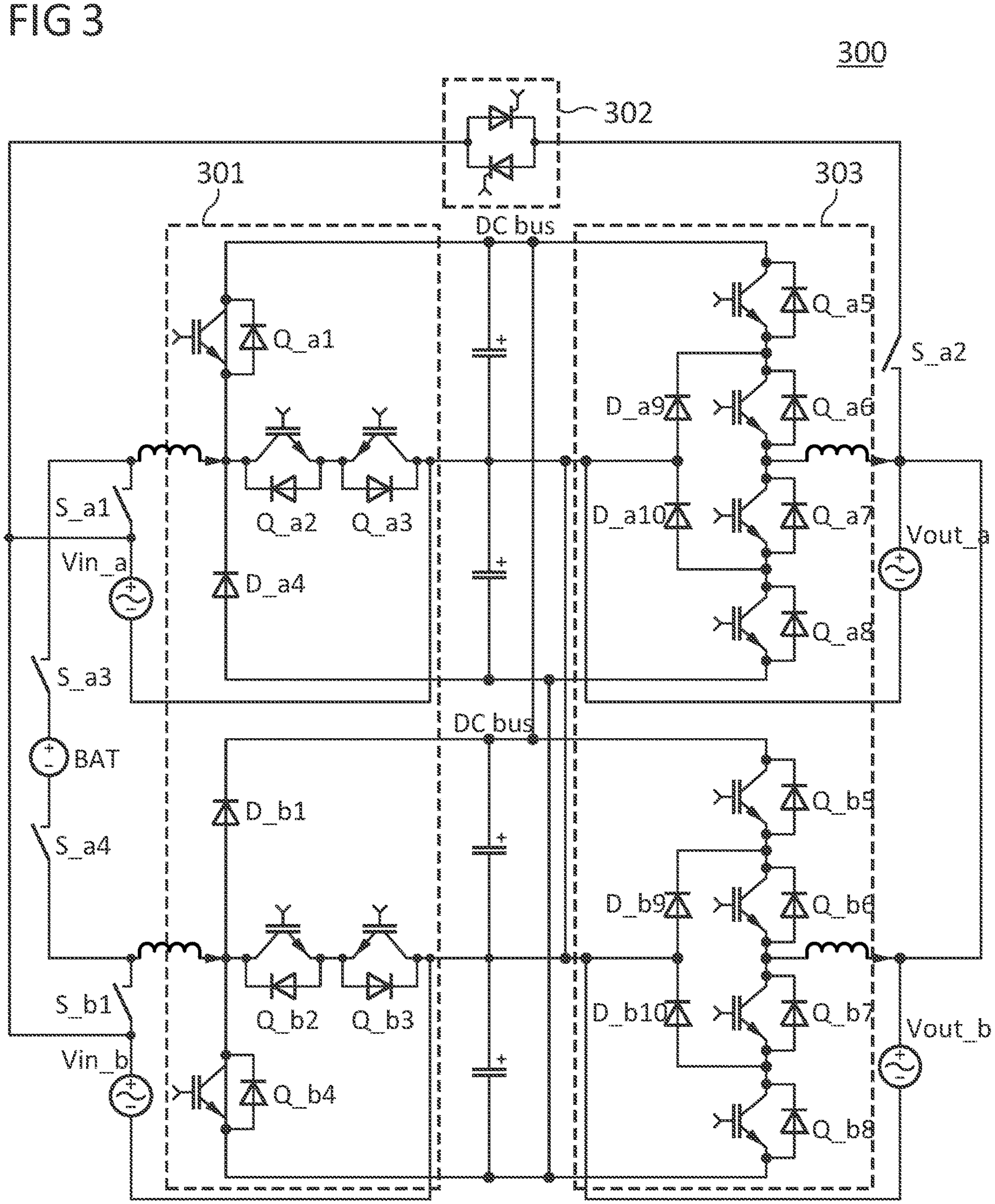
FIG. 3 is a detailed circuit diagram of a power supply system with a single-phase AC input according to a first implementation.

FIG. 3 is a detailed circuit diagram of a power supply system 300 with a single-phase AC input according to a first implementation.

As shown in FIG. 3, the power supply system 300 includes a rectification and charging-discharging module 301, a bypass module 302, a conversion module 303, switches S_a1, S_b1, S_a2, and S_a3, a battery BAT, input terminals Vin_a and Vin_b, and output terminals Vout_a and Vout_b. Two switch units of the rectification and charging-discharging module 301 are respectively connected to the AC input terminals Vin_a and Vin_b through the switches S_a1 and S_b1. The bypass module 302 is connected to the AC input terminals Vin_a and Vin_b at one end, and is connected to the output terminals Vout_a and Vout_b through the switch S_a2 at the other end. Two switch units of the conversion module 303 are respectively connected to corresponding switch units of the rectification and charging-discharging module 301 via the DC bus. The battery BAT is connected between the two switch units of the rectification and charging-discharging module 301 through the switch S_a3.

Preferably, the power supply system 300 may further include a switch S_a4. A positive electrode and a negative electrode of the battery BAT are connected between the two switch units of the rectification and charging-discharging module 301 through the switches S_a3 and S_a4 respectively.

In the implementation shown in FIG. 3, the rectification and charging-discharging module 301 includes an upper switch unit and a lower switch unit. The first switch unit includes transistors Q_a1, Q_a2 and Q_a3 and a diode D_a4. Transistors Q_a2 and Q_a3 are connected in series, and a collector of the transistor Q_a2 is coupled to the switch S_a1 through an inductor. An emitter of the transistor Q_a1 is connected to the collector of the transistor Q_a2, and a collector of the transistor Q_a1 is connected to the DC bus. A cathode of the diode D_a4 is connected to a collector of the transistor Q_a2, and an anode of the diode D_a4 is connected to the DC bus. The second switch unit includes transistors Q_b2, Q_b3 and Q_b4, and a diode D_b1. As shown in the Figure, elements of the second switch unit and elements of the first switch unit are arranged symmetrically.

Figure 1C:
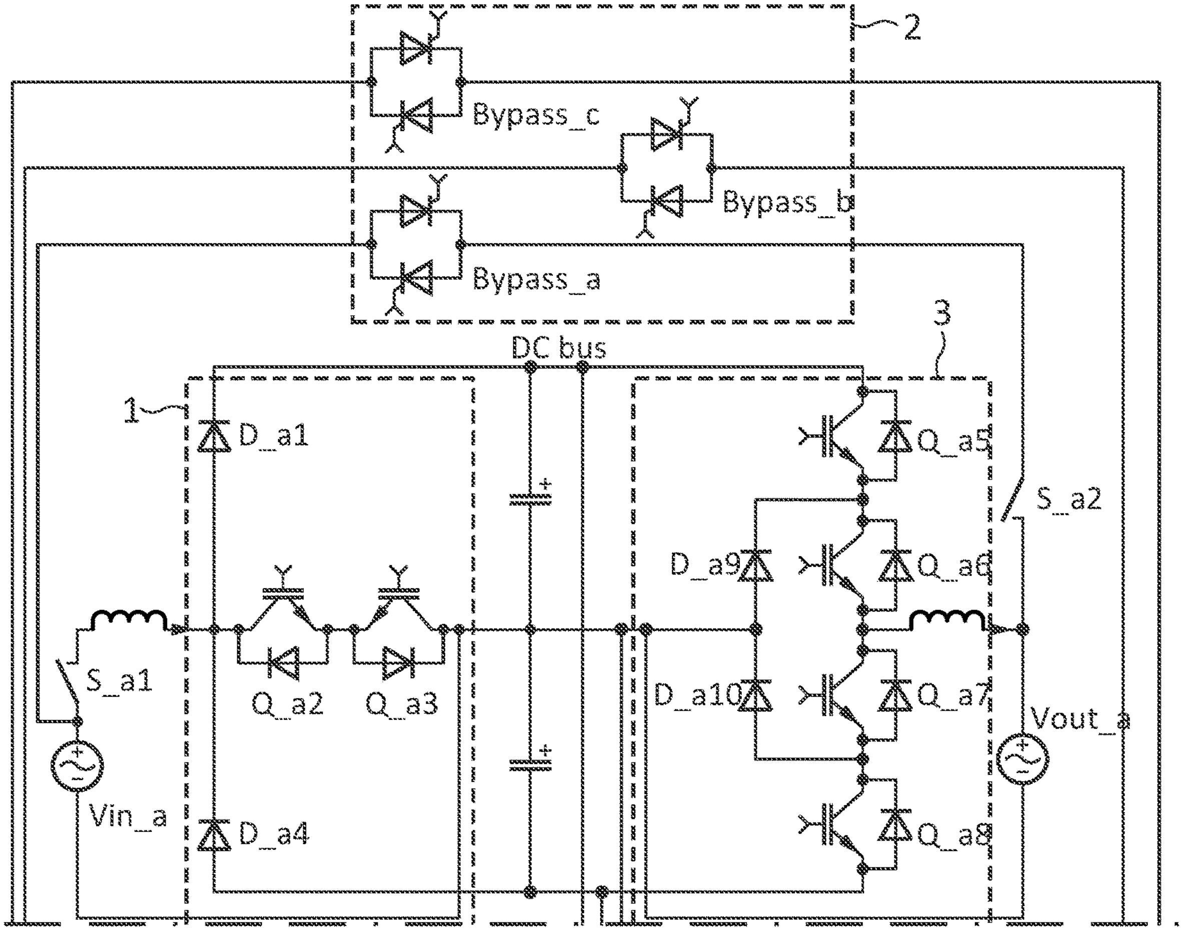
FIGS. 1C and 1D, as combined according to FIG. 1B, show the detailed circuit diagram of the UPS device shown in FIG. 1A.
Figure 1D:
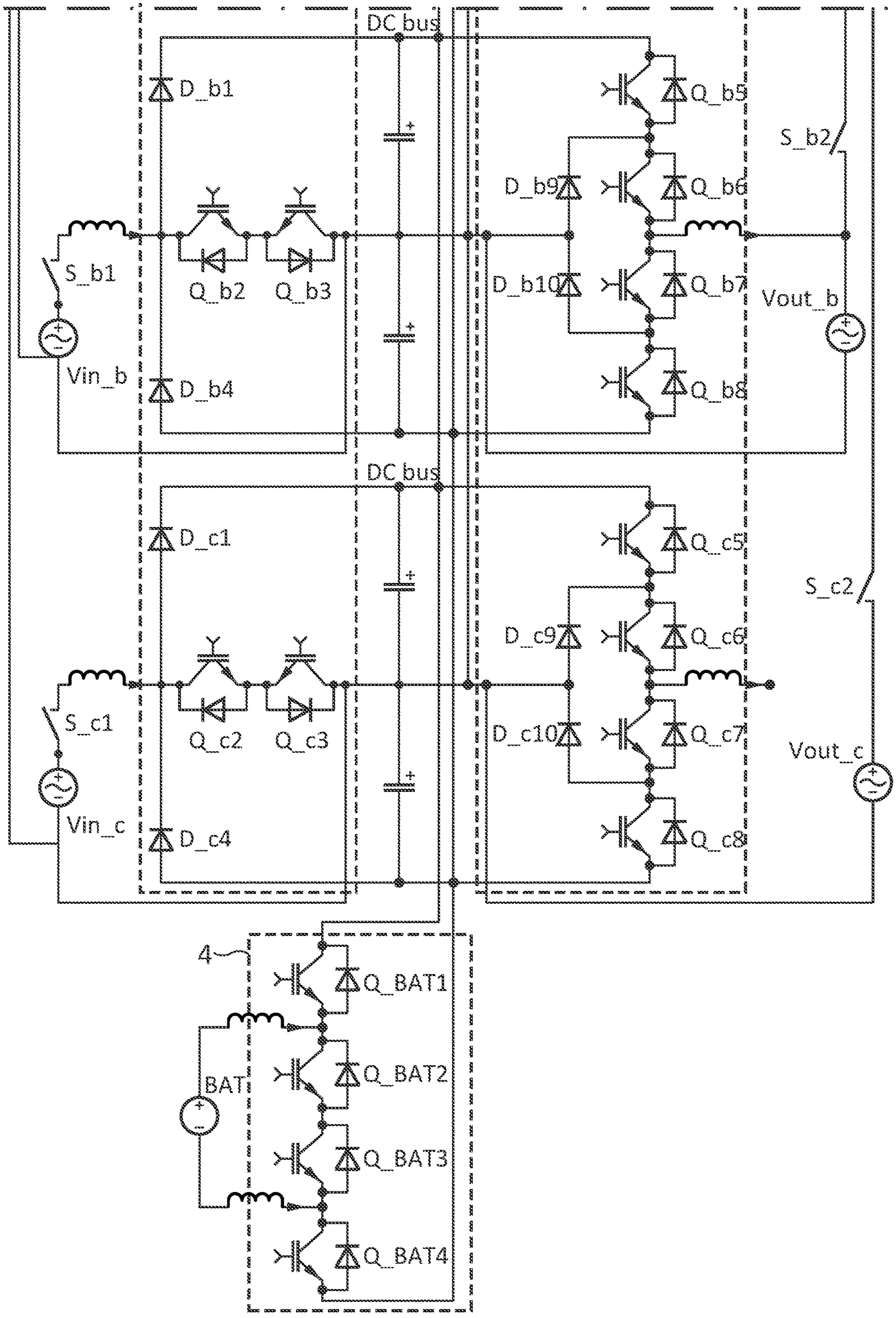

Referring to FIGS. 1C and 1D, a circuit structure of the conventional UPS is similar to the circuit structure shown in FIG. 3, except that the rectification and charging-discharging module 301 in FIG. 3 only includes two switch units, while the rectification module 1 in FIGS. 1C and 1D includes three switch units. In addition, diodes D_a1 and D_b4 in FIGS. 1C and 1D are replaced with transistors Q_a1 and Q_b4 in FIG. 3. It is known that the diode only has a rectification function. In the implementation shown in FIG. 3, by replacing the diodes D_a1 and D_b4 in FIGS. 1C and 1D with transistors Q_a1 and Q_b4, coupling the positive electrode of the battery BAT to the emitter of the transistor Q_a1 and coupling the negative electrode of the battery BAT to the collector of the transistor Q_b4, a total number of inductors and transistors in the power supply system is reduced, while charging and discharging of the battery is realized.

It should be pointed out that in the line mode and in the battery mode, the two switch units of the rectification and charging-discharging module 301 are coupled between respective one of the positive electrode and the negative electrode of the battery BAT and the DC bus. In the AC out of limit mode, the two switch units are connected in parallel.

As shown in FIG. 3, the bypass module 302 includes, for example, two thyristors in reverse parallel. The conversion module 303 includes two switch units. The first switch unit includes transistors Q_a5, Q_a6, Q_a7 and Q_a8 that are connected in series, and diodes D_a9 and D_a10 that are coupled between Q_a5 and Q_a8 and connected in series. The second switch unit includes transistors Q_b5, Q_b6, Q_b7 and Q_b8 that are connected in series, and diodes D_b9 and D_b10 that are coupled between Q_b5 and Q_b8 and connected in series.

Figure 4A:
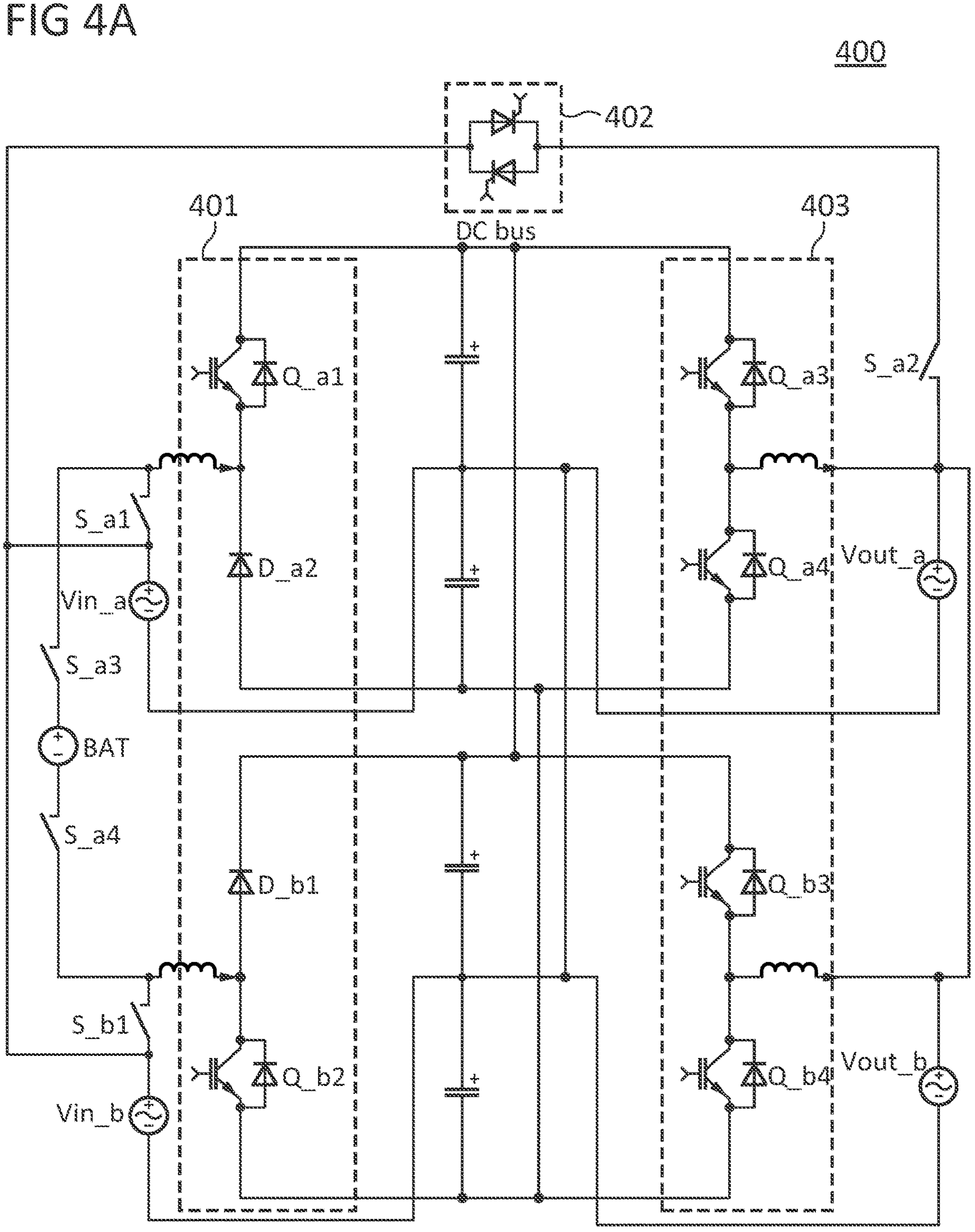
FIGS. 4A and 4B are detailed circuit diagrams of a variant of the power supply system shown in FIG. 3.
Figure 4B:
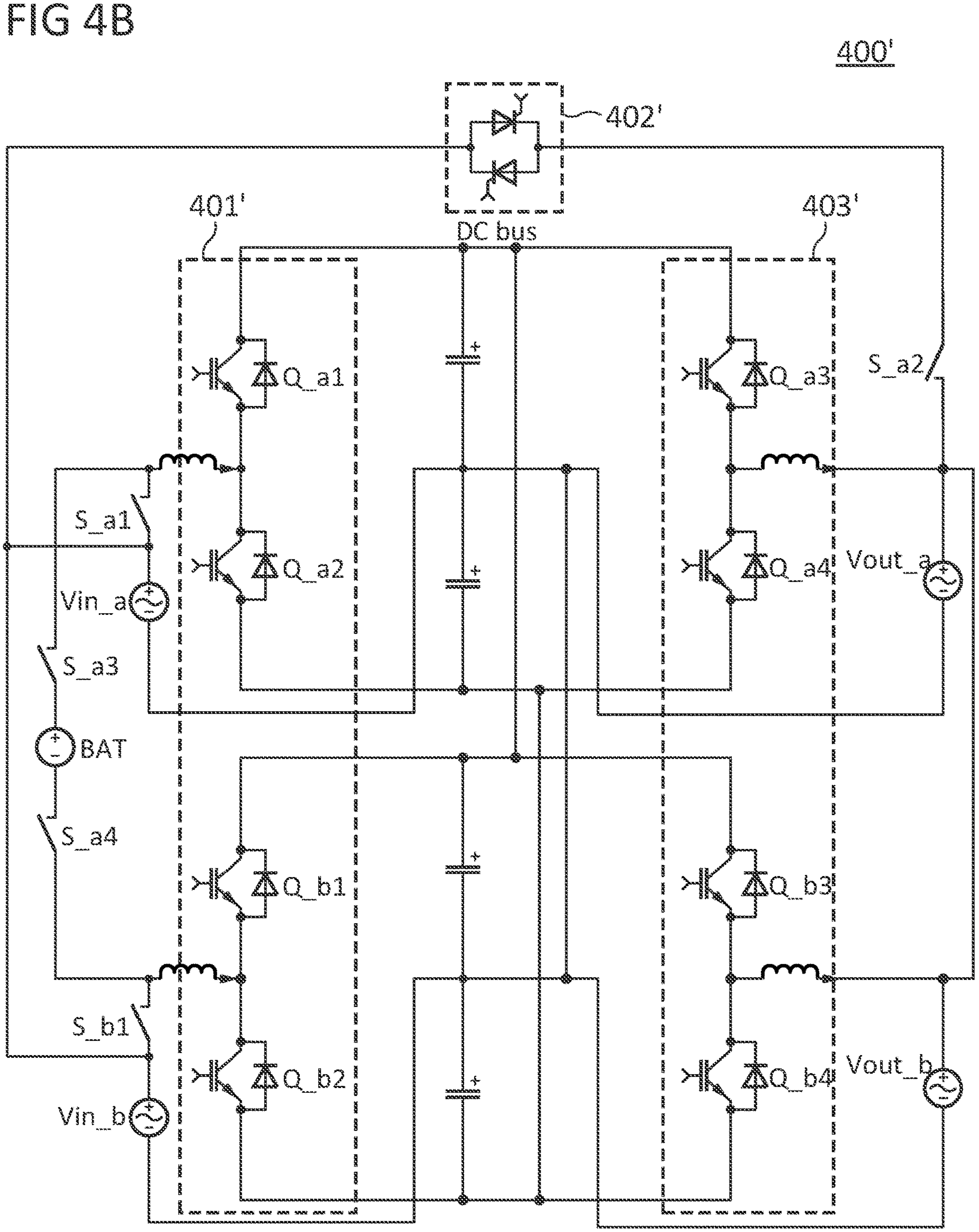

FIG. 4A and FIG. 4B show variant implementations of the power supply system 300 shown in FIG. 3. The power supply system 400 in FIG. 4A and the power supply system 400' in FIG. 4B are different from the power supply system 300 in FIG. 3 in the circuit structure of the rectification and charging-discharging module and the conversion module.

More particularly, in this implementation, a first switch unit of a rectification and charging-discharging module 401 in FIG. 4A includes a transistor Q_a1 and a diode D_a2. An emitter of the transistor Q_a1 is connected to a cathode of the diode D_a2 and coupled to the switch S_a1 through an inductor. A collector of the transistor Q_a1 and an anode of the diode D_a2 is connected to the DC bus. A second switch unit includes a transistor Q_b2 and a diode D_b1. Elements of the second switch unit and element of the first switch unit are arranged symmetrically.

A first switch unit of a conversion module 403 shown in FIG. 4A includes transistors Q_a3 and Q_a4 that are connected in series. A second switch unit of the conversion module 403 includes transistors Q_b3 and Q_b4 that are connected in series.

A first switch unit of a rectification and charging-discharging module 401' in FIG. 4B includes transistors Q_a1 and Q_a2 that are connected in series. A second switch unit of the rectification and charging-discharging module 401' includes transistors Q_b1 and Q_b2 that are connected in series.

A circuit structure of a conversion module 403' in FIG. 4B is the same as that of the conversion module 403 shown in FIG. 4A. A circuit structure of the bypass module 402 in FIG. 4A and a circuit structure of the bypass module 402' in FIG. 4B is the same as that of the bypass module 302 shown in FIG. 3.

Figure 5A:
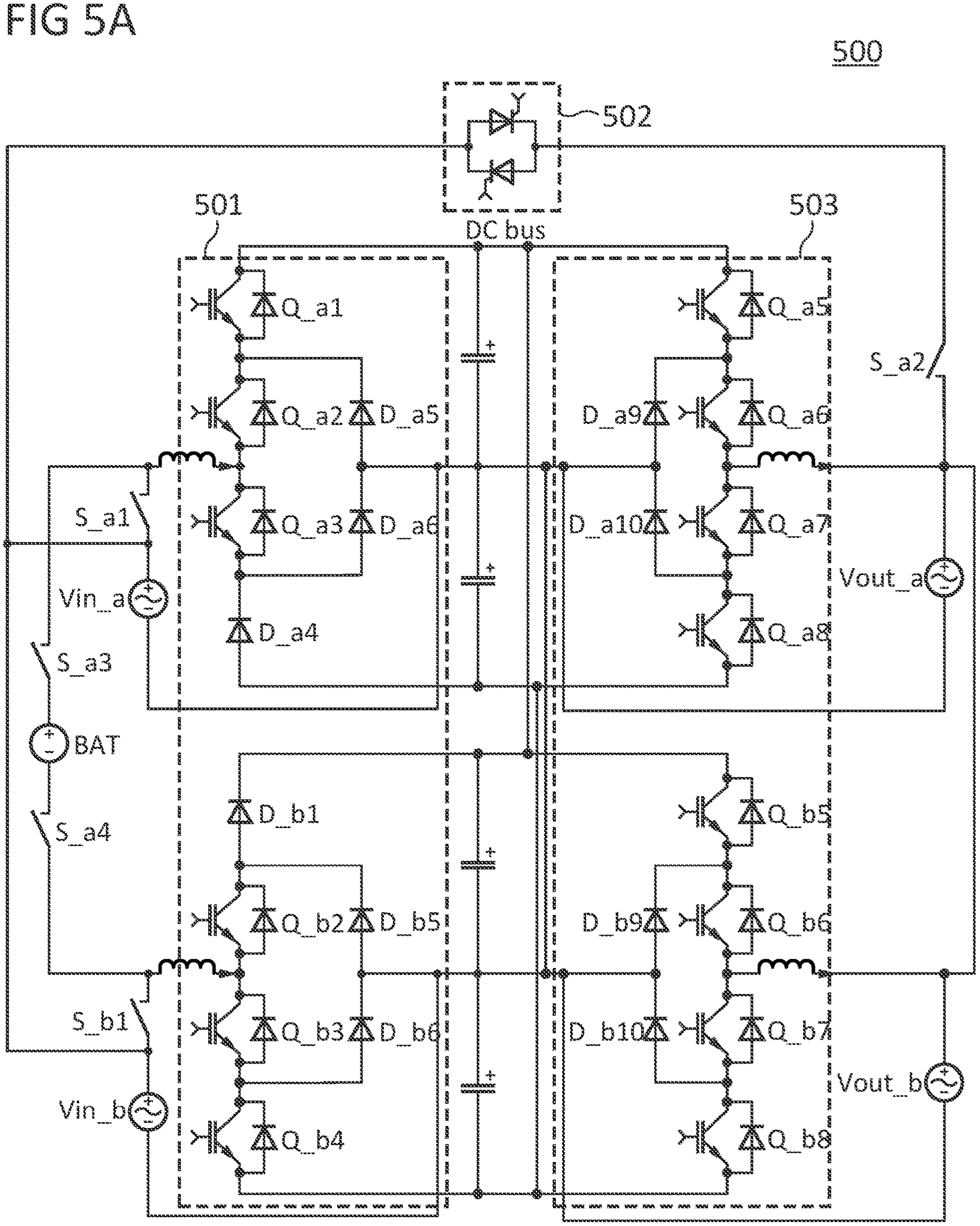
FIGS. 5A and 5B are detailed circuit diagrams of a variant of the power supply system shown in FIG. 3.
Figure 5B:
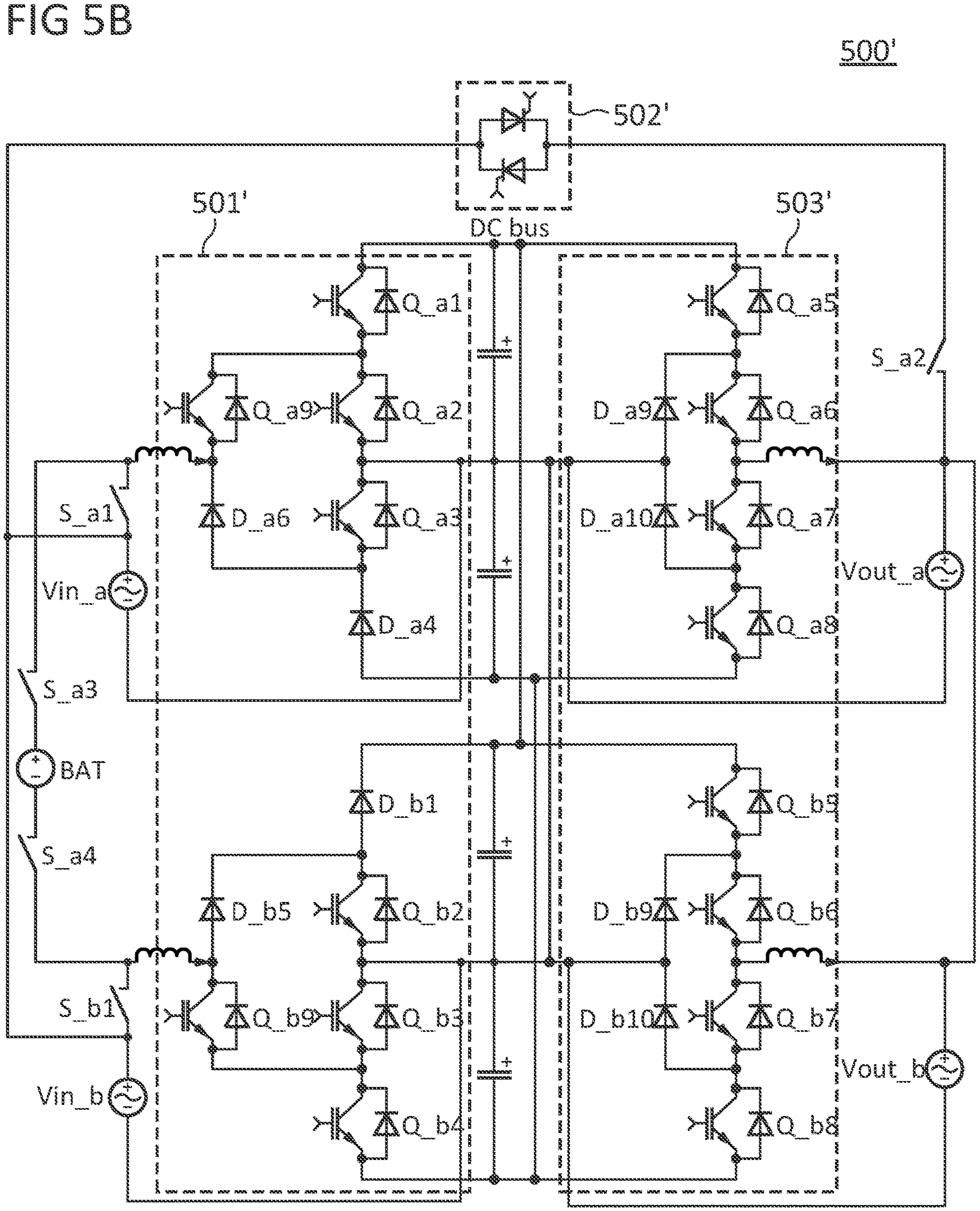

FIG. 5A and FIG. 5B show variant implementations of the power supply system 300 shown in FIG. 3. The power supply system 500 in FIG. 5A and the power supply system 500' in FIG. 5B are different from the power supply system 300 in FIG. 3 in circuit structures of the rectification and charging-discharging module and the conversion module.

More particularly, in this implementation, a first switch unit of the rectification and charging-discharging module 501 in FIG. 5A includes transistors Q_a1, Q_a2 and Q_a3 that are connected in series, a diode D_a4, and diodes D_a5 and D_a6 that are connected in series. The diodes D_a5 and D_a6 are coupled between a transistor Q_a1 and a diode D_a4. An emitter of the transistor Q_a1 is connected to a collector of the transistor Q_a2 and a collector of the transistor Q_a1 is connected to the DC bus. A cathode of the diode D_a4 is connected to an emitter of the transistor Q_a3, and an anode of the diode D_a4 is connected to the DC bus. A second switch unit of the rectification and charging-discharging module 501 includes transistors Q_b2, Q_b3 and Q_b4 that are connected in series, a diode D_b1, and diodes D_b5 and D_b6 that are connected in series. Elements of the second switch unit and elements of the first switch unit are arranged symmetrically.

A first switch unit of a conversion module 503 shown in FIG. 5A includes transistors Q_a5, Q_a6, Q_a7 and Q_a8 that are connected in series, and diodes D_a9 and D_a10 that are connected in series. The diodes D_a9 and D_a10 are coupled between transistors Q_a5 and Q_a8. A second switch unit includes transistors Q_b5, Q_b6, Q_b7 and Q_b8 that are connected in series, and diodes D_b9 and D_b10 that are connected in series. The diodes D_b9 and D_b10 are coupled between transistors Q_b5 and Q_b8.

A first switch unit of the rectification and charging-discharging module 501' in FIG. 5B includes transistors Q_a1, Q_a2 and Q_a3 that are connected in series, a diode D_a4, and a transistor Q_a9 and a diode D_a6 that are connected in series. The transistor Q_a9 and the diode D_a6 are coupled between the transistor Q_a1 and the diode D_a4. A collector of the transistor Q_a9 is connected to an emitter of the transistor Q_a1. An emitter of the transistor Q_a9 coupled to the switch S_a1 through an inductor and is connected to a cathode of the diode D_a6. An anode of the diode D_a6 is connected to a cathode of the diode D_a4. A second switch unit of the rectification and charging-discharging module 501' includes transistors Q_b2, Q_b3 and Q_b4 that are connected in series, a diode D_b1, and a transistor Q_b9 and a diode D_b5 that are connected in series. Elements of the second switch unit and the elements of the first switch unit are arranged symmetrically.

A circuit structure of a conversion module 503' in FIG. 5B is the same as that of a conversion module 503 in FIG. 5A. A bypass module 502 in FIG. 5A and a bypass module 502' in FIG. 5B are the same as the bypass module 302 shown in FIG. 3.

Figure 6A:
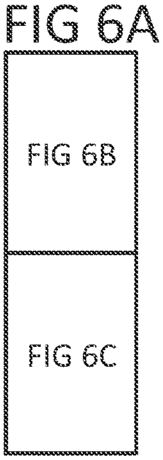
FIG. 6A shows an arrangement of FIGS. 6B and 6C, which are conjoined as shown in FIG. 6A.
Figure 6B:
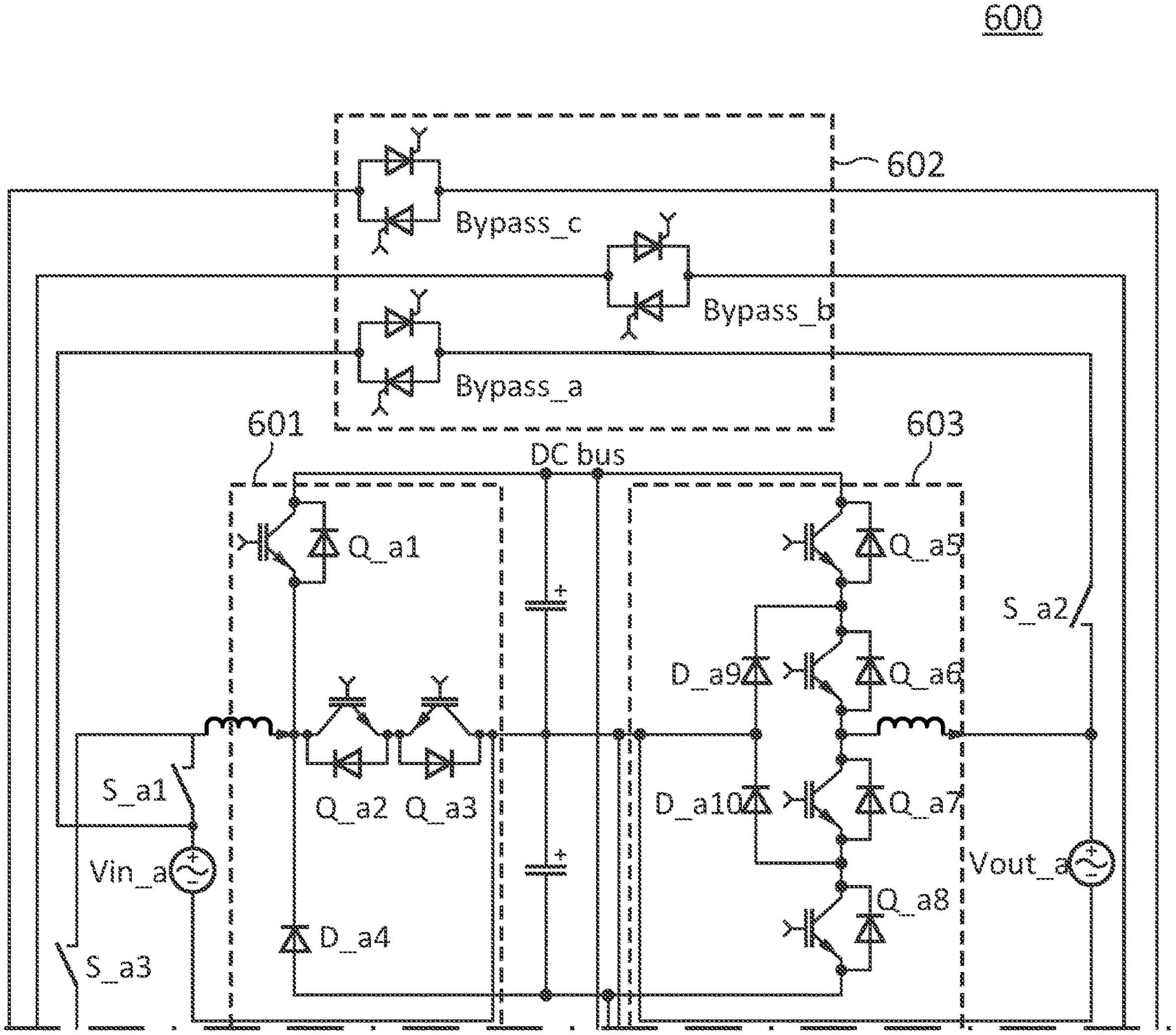
FIGS. 6B and 6C show a detailed circuit diagram of a power supply system with a three-phase AC input according to a second implementation of the present disclosure.
Figure 6C:
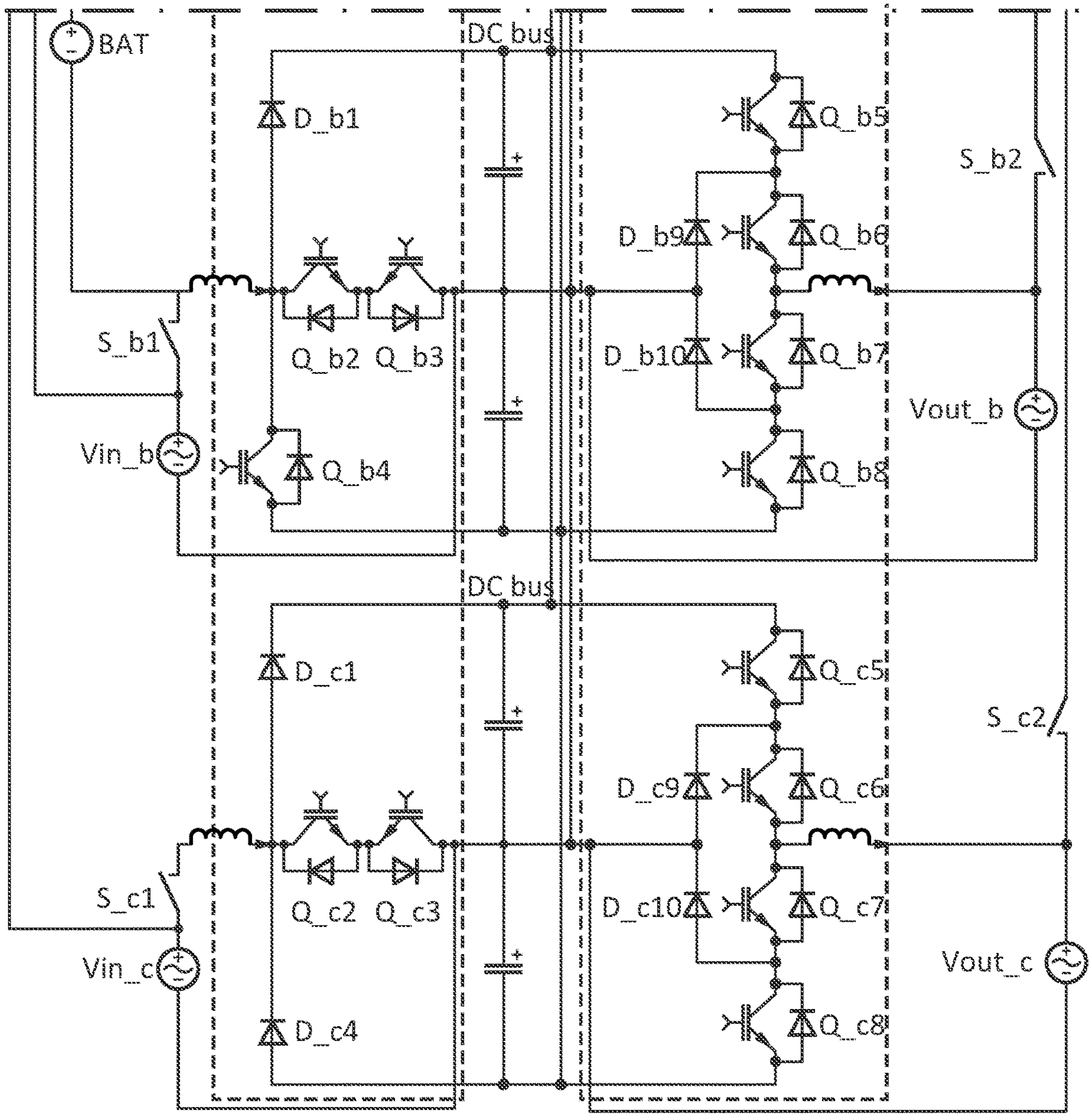

FIG. 6A shows an arrangement of FIGS. 6B and 6C, which are conjoined as shown in FIG. 6A.

FIGS. 6B and 6C show a detailed circuit diagram of a power supply system 600 with a three-phase AC input according to a second implementation of the present disclosure. As shown in FIGS. 6B and 6C, each of a rectification and charging-discharging module 601, a bypass module 602 and a conversion module 603 of the power supply system 600 includes three switch units. The three switch units of the rectification and charging-discharging module 601 are respectively connected to three phases Vin_a, Vin_b and Vin_c of the AC input through the switches S_a1, S_b1 and S_c1. Circuit structures of the first switch unit and the second switch unit are the same as that shown in FIG. 3. The third switch unit includes transistors Q_c2 and Q_c3 that are connected in series, and diodes D_c1 and D_c4 that are connected in series. A positive electrode of the battery BAT is connected to the first switch unit through the switch S_a3, and a negative electrode of the battery BAT is connected to the second switch unit. Circuit structures of the three switch units of the conversion module 603 are the same as that shown in FIG. 3. The three switch units Bypass_a, Bypass_b and Bypass_c of the bypass module 602 each includes a pair of thyristors in reverse parallel, which are respectively connected to outputs Vout_a, Vout_b and Vout_c through switches S_a2, S_b2 and S_c2.

Figure 7:
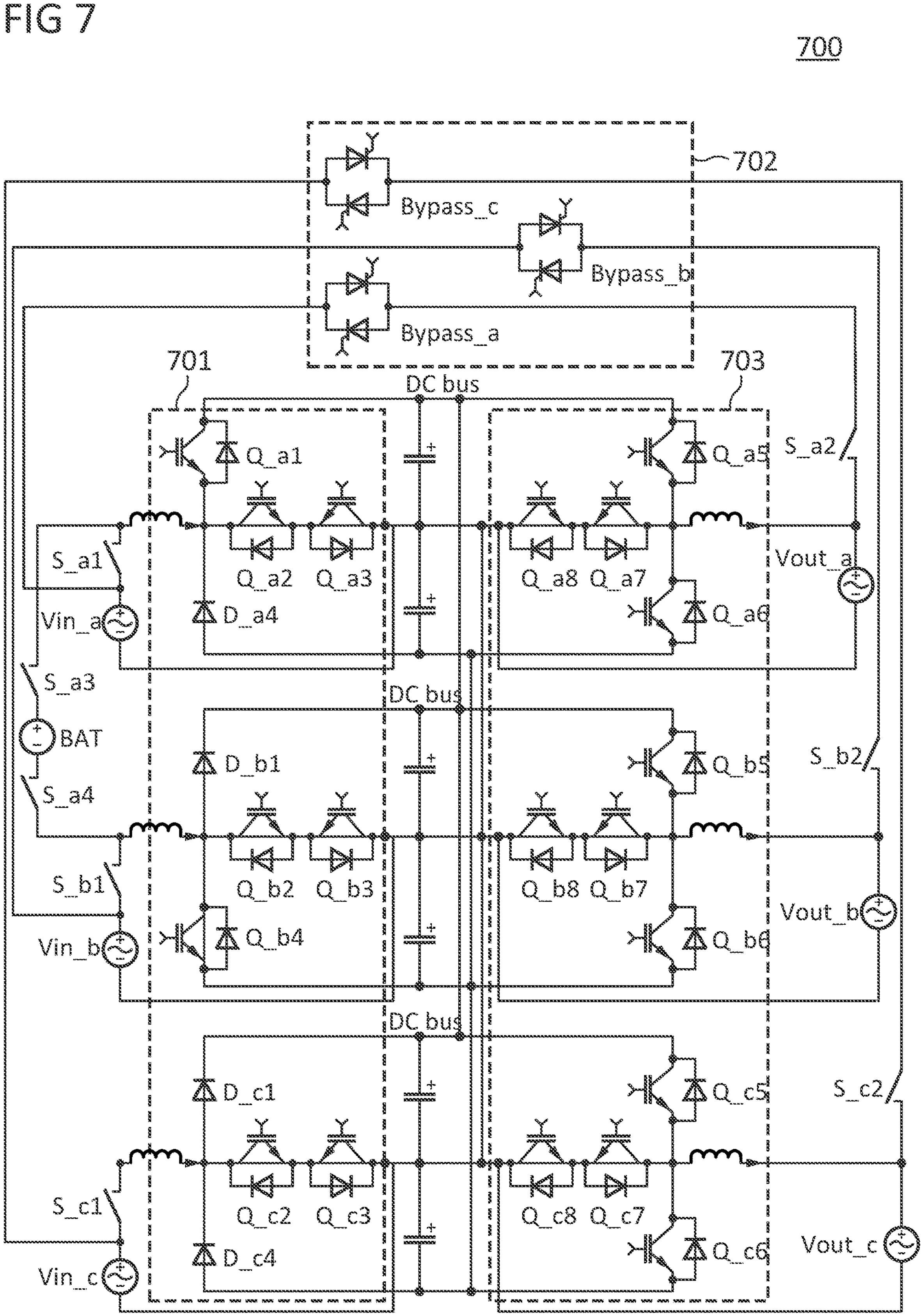
FIG. 7 is a detailed circuit diagram of a power supply system with a three-phase AC input according to a third implementation.

FIG. 7 shows a detailed circuit diagram of a power supply system with a three-phase AC input according to a third implementation of the present disclosure. A circuit structure of a power supply system 700 in FIG. 7 is substantially the same as that of the power supply system 600 in FIGS. 6B and 6C, except that the negative electrode of the battery BAT is further connected to a second switch unit of a rectification and charging-discharging module 701 through a switch S_a4.

As shown in FIGS. 1C and 1D, circuit structures shown in FIGS. 6B and 6C and FIG. 7 are basically the same as the circuit structure of the conventional UPS, except that diodes D_a1 and D_b4 in FIGS. 1C and 1D are replaced with transistors Q_a1 and Q_b4 in FIGS. 6B and 6C and FIG. 7. It is known that the diode only has a rectification function. In the implementation shown in FIG. 3, by replacing the diodes D_a1 and D_b4 in FIGS. 1C and 1D by the transistors Q_a1 and Q_b4, coupling the positive electrode of battery BAT to the emitter of the transistor Q_a1 and coupling the negative electrode of battery BAT to the collector of the transistor Q_b4, a total number of inductors and transistors in the power supply system is reduced, while charging and discharging of the battery are realized.

Figure 8A:
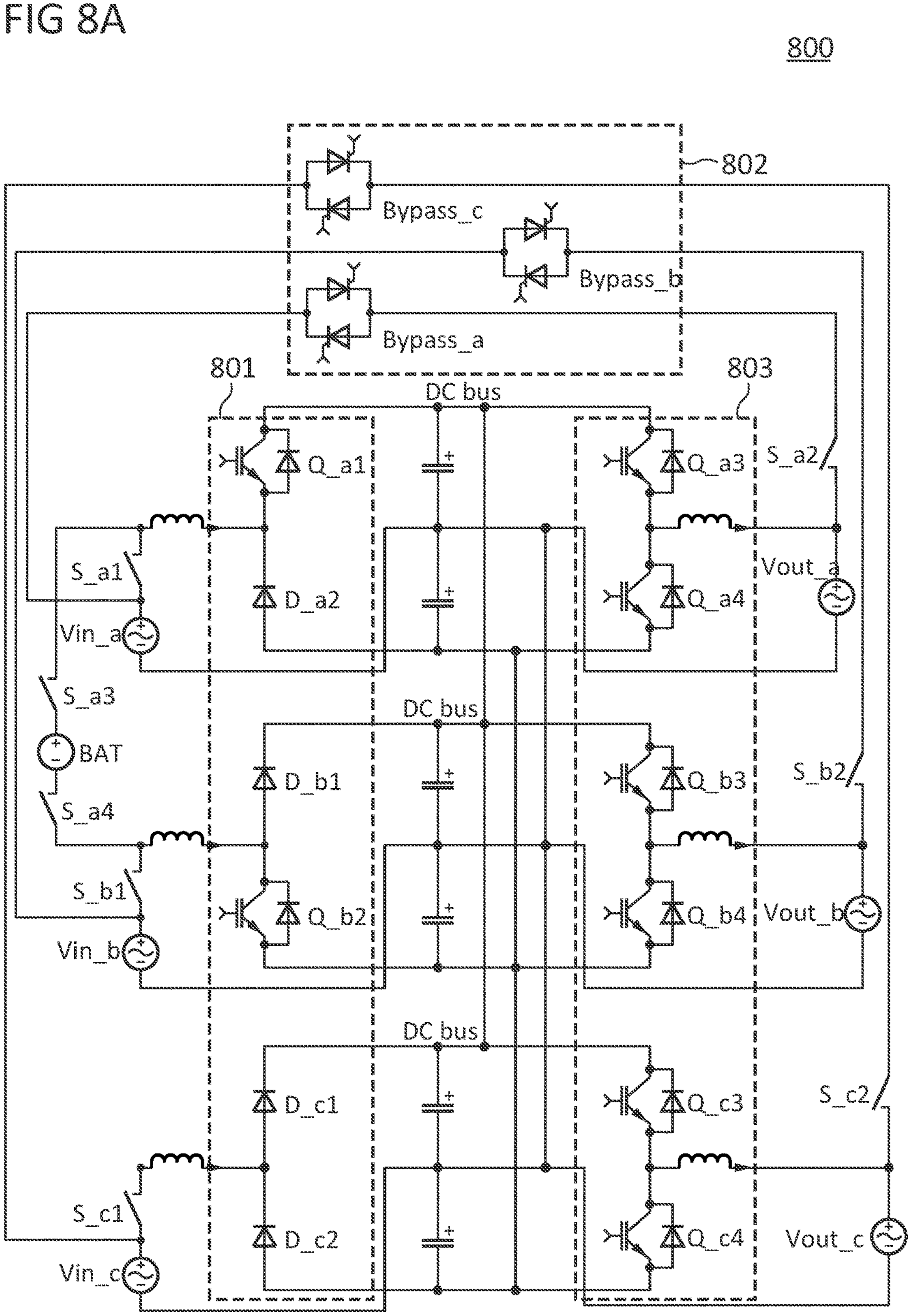
FIGS. 8A and 8B are detailed circuit diagrams of a variants of the power supply system shown in FIG. 7.
Figure 8B:
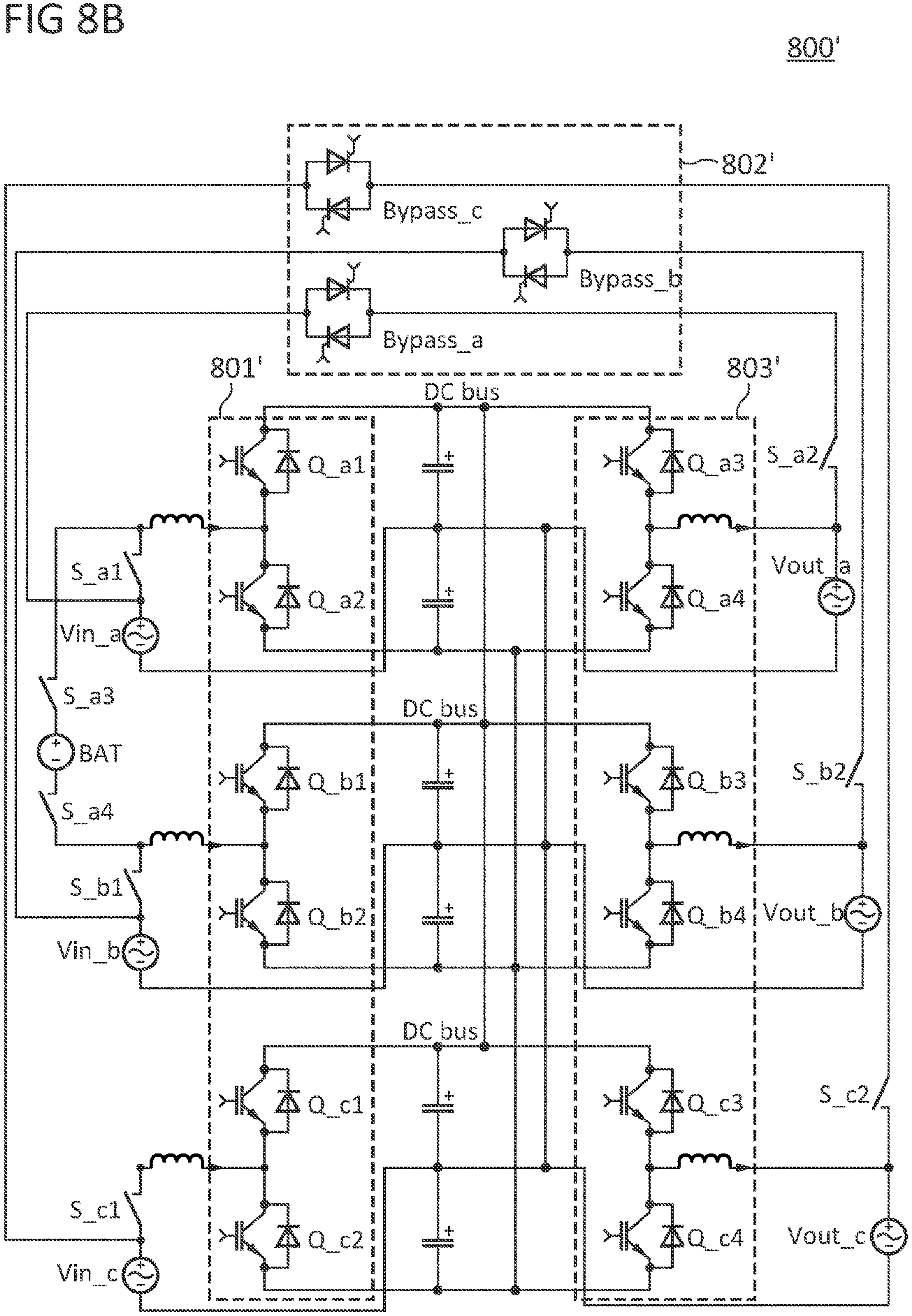

FIG. 8A and FIG. 8B show detailed circuit diagrams of variant implementations of the power supply system shown in FIG. 7. A power supply system 800 in FIG. 8A and a power supply system 800' in FIG. 8B are different from the power supply system 700 in FIG. 7 in circuit structures of the rectification and charging-discharging module and the conversion module.

More particularly, in this implementation, the rectification and charging-discharging module 801 in FIG. 8A includes three switch units. Circuit structures of a first switch unit and a second switch unit among the three switch units are the same as that of the rectification and charging-discharging module 401 shown in FIG. 4A, and a third switch unit includes diodes D_c1 and D_c2 that are connected in series.

The conversion module 803 in FIG. 8A includes three switch units. Circuit structures of a first switch unit and a second switch unit among the three switch units are the same as that of the conversion module 403 shown in FIG. 4A, and a third switch unit includes transistors Q_c3 and Q_c4 that are connected in series.

A rectification and charging-discharging module 801' in FIG. 8B includes three switch units. Circuit structures of a first switch unit and a second switch unit among the three switch units are the same as that of the switch unit of the rectification and charging-discharging module 401' shown in FIG. 4B, and a third switch unit includes transistors Q_c1 and Q_c2 that are connected in series.

A conversion module 803' in FIG. 8B includes three switch units. Circuit structures of a first switch unit and a second switch unit among the three switch units are the same as that of the switch unit of the conversion module 403' shown in FIG. 4B, and a third switch unit includes transistors Q_c3 and Q_c4 that are connected in series.

A bypass module 802 in FIG. 8A and a bypass module 802' in FIG. 8B are the same as the bypass module 702 shown in FIG. 7.

Figure 9A:
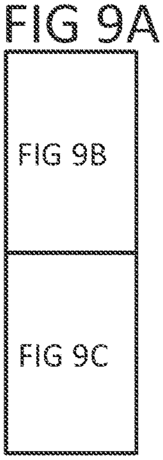
FIG. 9A shows an arrangement of FIGS. 9B and 9C, which are conjoined as shown in FIG. 9A.
Figure 9B:
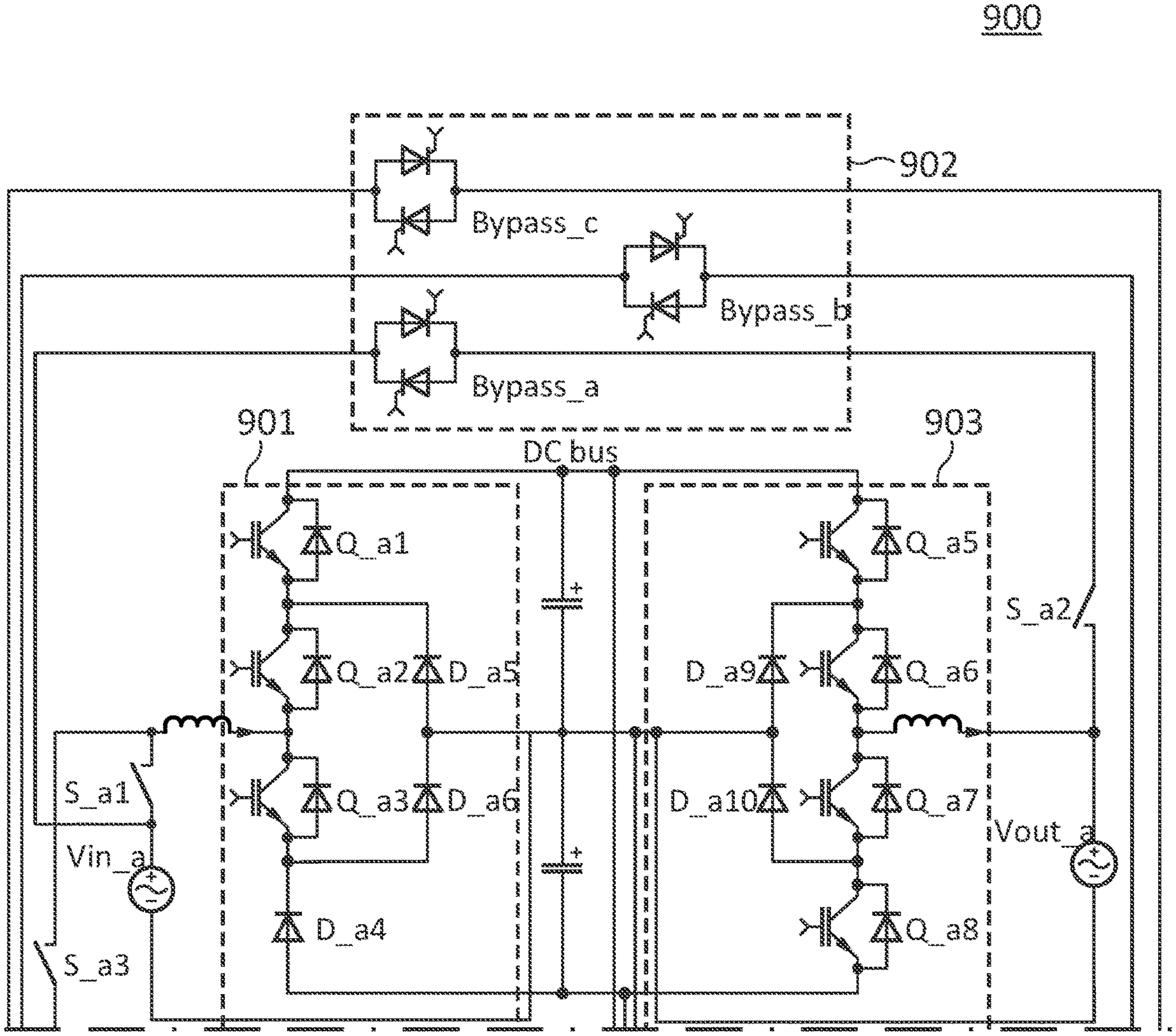
FIG. 9B and FIG. 9C show a detailed circuit diagram of a power supply system, which is a variant of the power supply system in FIG. 7.
Figure 9C:
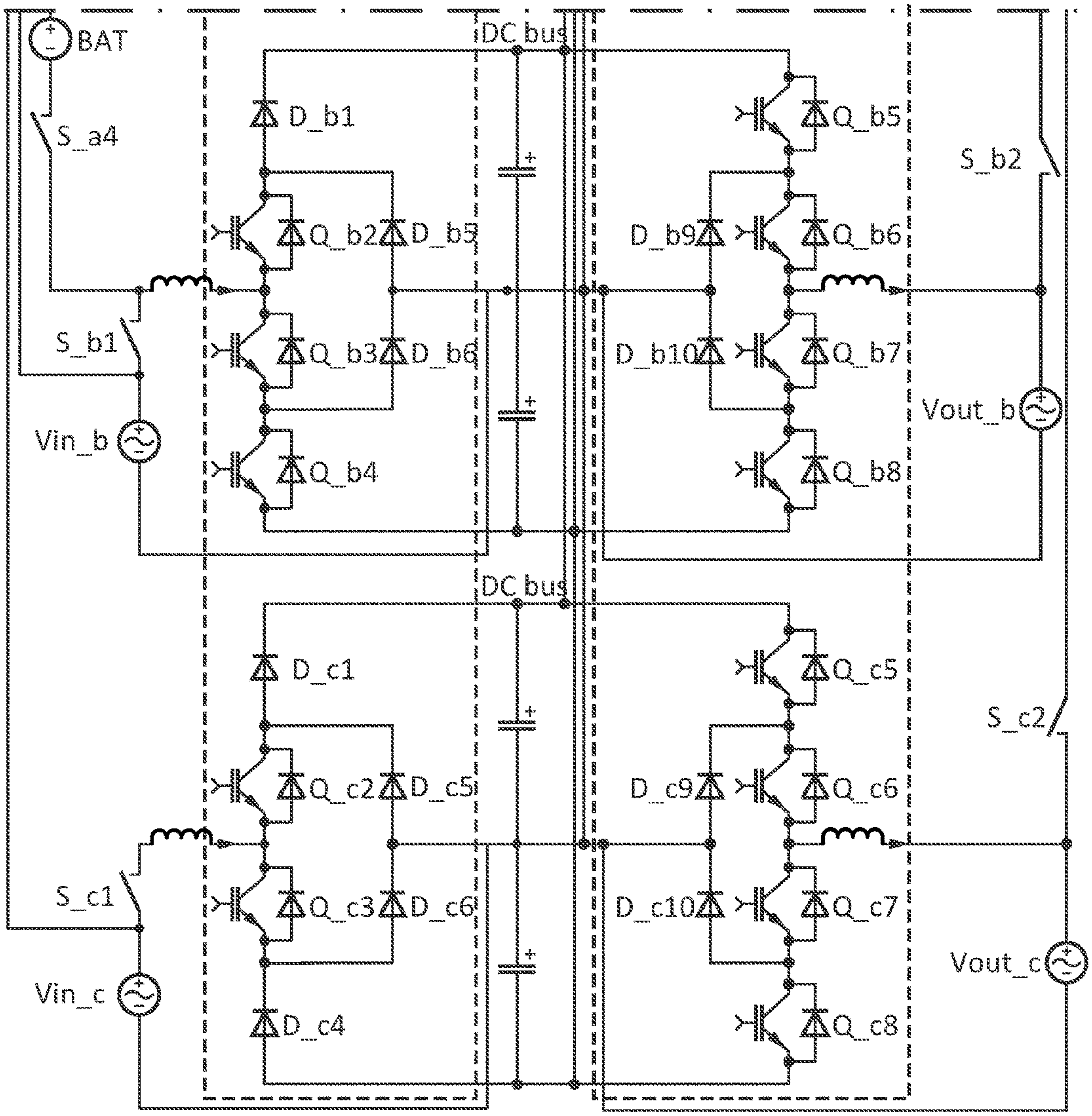

FIG. 9A shows an arrangement of FIGS. 9B and 9C, which are conjoined as shown in FIG. 9A. FIG. 9B and FIG. 9C show a detailed circuit diagram of a power supply system 900, which is a variant of the power supply system in FIG. 7.

Figure 9D:
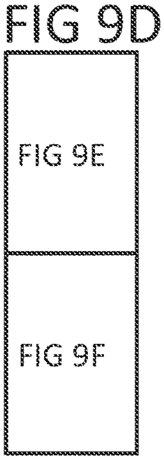
FIG. 9D shows an arrangement of FIGS. 9E and 9F, which are conjoined as shown in FIG. 9D.
Figure 9E:
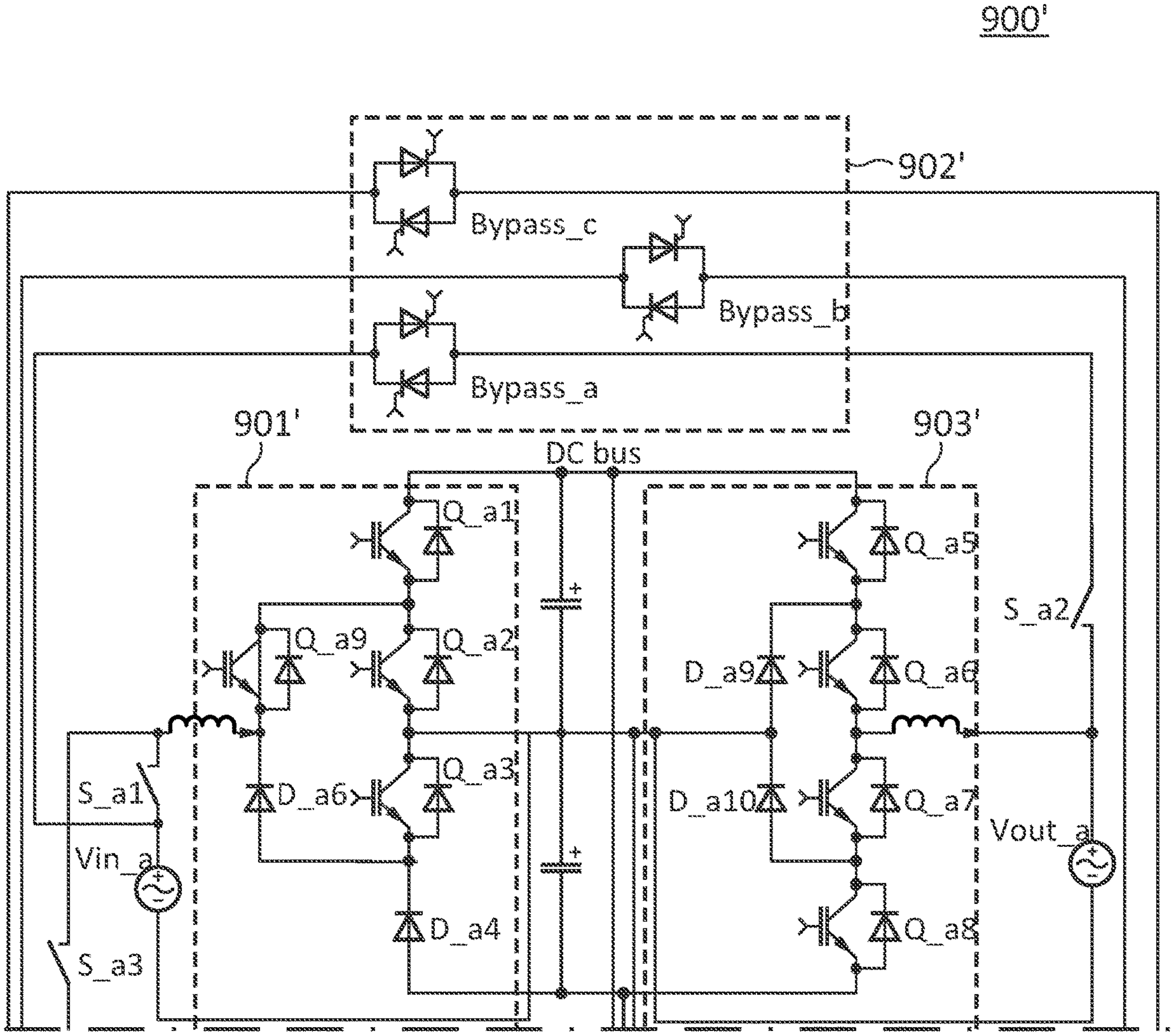
FIG. 9E and FIG. 9F show a detailed circuit diagram of a power supply system, which is a variant of the power supply system in FIG. 7.
Figure 9F:
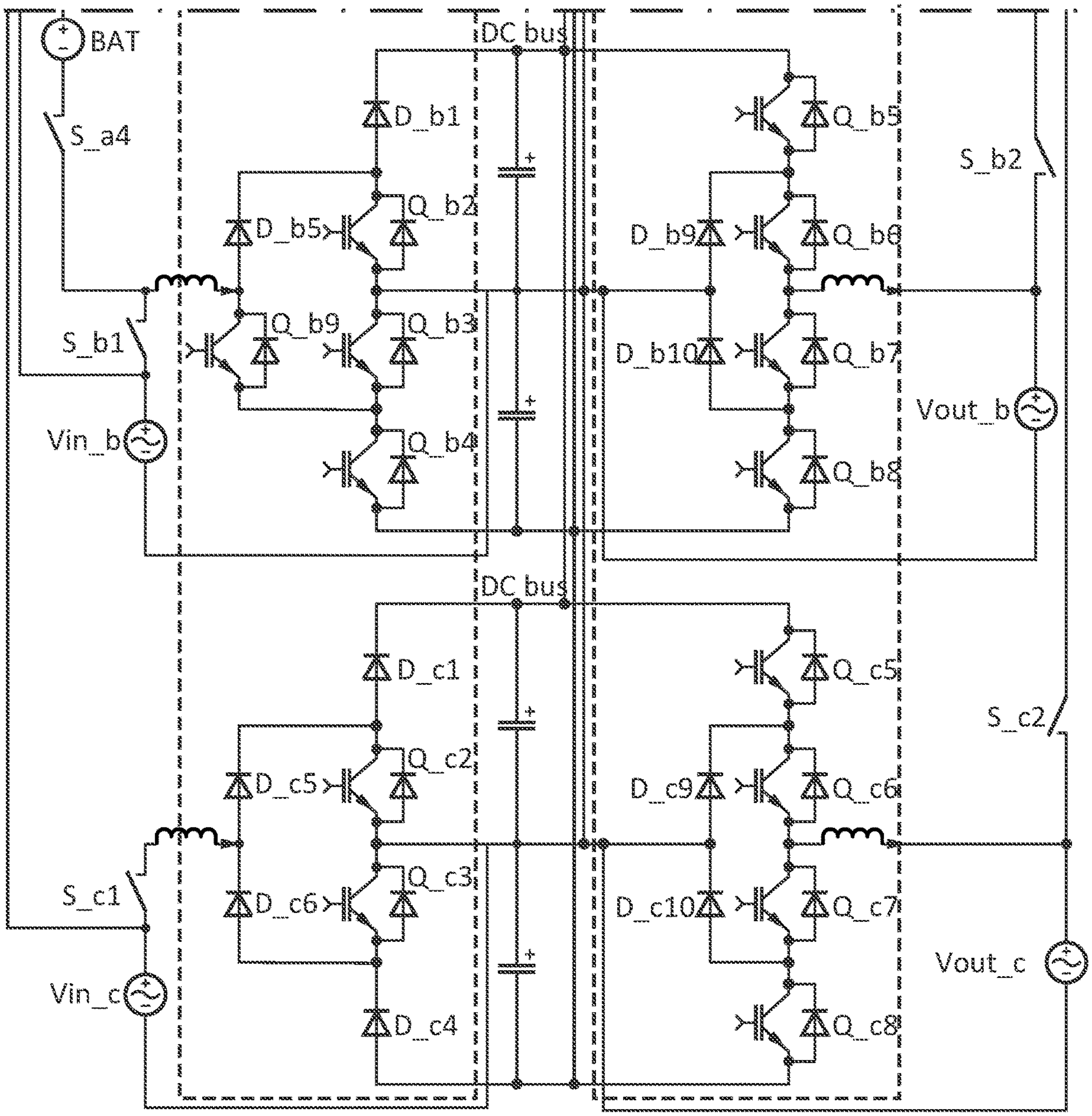

FIG. 9D shows an arrangement of FIGS. 9E and 9F, which are conjoined as shown in FIG. 9D. FIG. 9E and FIG. 9F show a detailed circuit diagram of a power supply system 900', which is a variant of the power supply system in FIG. 7.

The power supply system 900 in FIGS. 9B and 9C and the power supply system 900' in FIGS. 9E and 9F are different from the power supply system 700 in FIG. 7 in circuit structures of the rectification and charging-discharging module and the conversion module.

More particularly, in this implementation, a rectification and charging-discharging module 901 in FIGS. 9B and 9C includes three switch units. Circuit structures of a first switch unit and a second switch unit among the three switch units are the same as that of the switch unit of the rectification and charging-discharging module 501 shown in FIG. 5A, and a third switching unit includes a diode D_c1, transistors Q_c2 and Q_c3, and a diode D_c4 that are connected in series, and diodes D_c5 and D_c6 that are connected in series. Diodes D_c5 and D_c6 are coupled between diodes D_c1 and D_c4.

The conversion module 903 in FIGS. 9B and 9C includes three switch units. Circuit structures of a first switch unit and a second switch unit among the three switch units are the same as that of the conversion module 503 shown in FIG. 5A, and a third switch unit includes transistors Q_c5, Q_c6, Q_c7 and Q_c8 that are connected in series, and diodes D_c9 and D_c10 that are connected in series and coupled between diodes Q_c5 and Q_c8.

A rectification and charging-discharging module 901' in FIGS. 9E and 9F includes three switch units. Circuit structures of a first switch unit and a second switch unit among the three switch units are the same as that of the switch unit of the rectification and charging-discharging module 501' shown in FIG. 5B, and a third switch unit includes a diode D_c1, transistors Q_c2 and Q_c3, and a diode D_c4 that are connected in series, and diodes D_c5 and D_c6 that are connected in series and coupled between diodes D_c1 and D_c4.

A conversion module 903' in FIGS. 9E and 9F includes three switch units. Circuit structures of a first switch unit and a second switch unit among the three switch units are the same as that of the switch units of the conversion module 503' shown in FIG. 5B, and a third switch unit includes transistors Q_c5, Q_c6, Q_c7 and Q_c8 that are connected in series, and diodes D_c9 and D_c10 that are connected in series and coupled between transistors Q_c5 and Q_c8.

A bypass module 902 in FIGS. 9B and 9C and a bypass module 902' in FIGS. 9E and 9F are the same as the bypass module 702 shown in FIG. 7.

It should be pointed out that although transistors are shown as insulated gate bipolar transistors (IGBT) in the drawings, the transistors in the present disclosure are not limited to insulated gate bipolar transistors. The transistors may be any other types of transistors that are capable of realizing the same function, such as but not limited to metal oxide semiconductor field effect transistors (MOSFET), field effect transistors (FET), junction field effect transistors (JFET), double gate MOSFET, and the like.

Figure 10A:
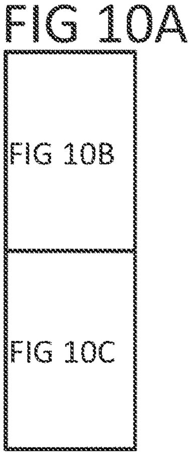
FIG. 10A shows an arrangement of FIGS. 10B and 10C, which are conjoined as shown in FIG. 10A.
Figure 10B:
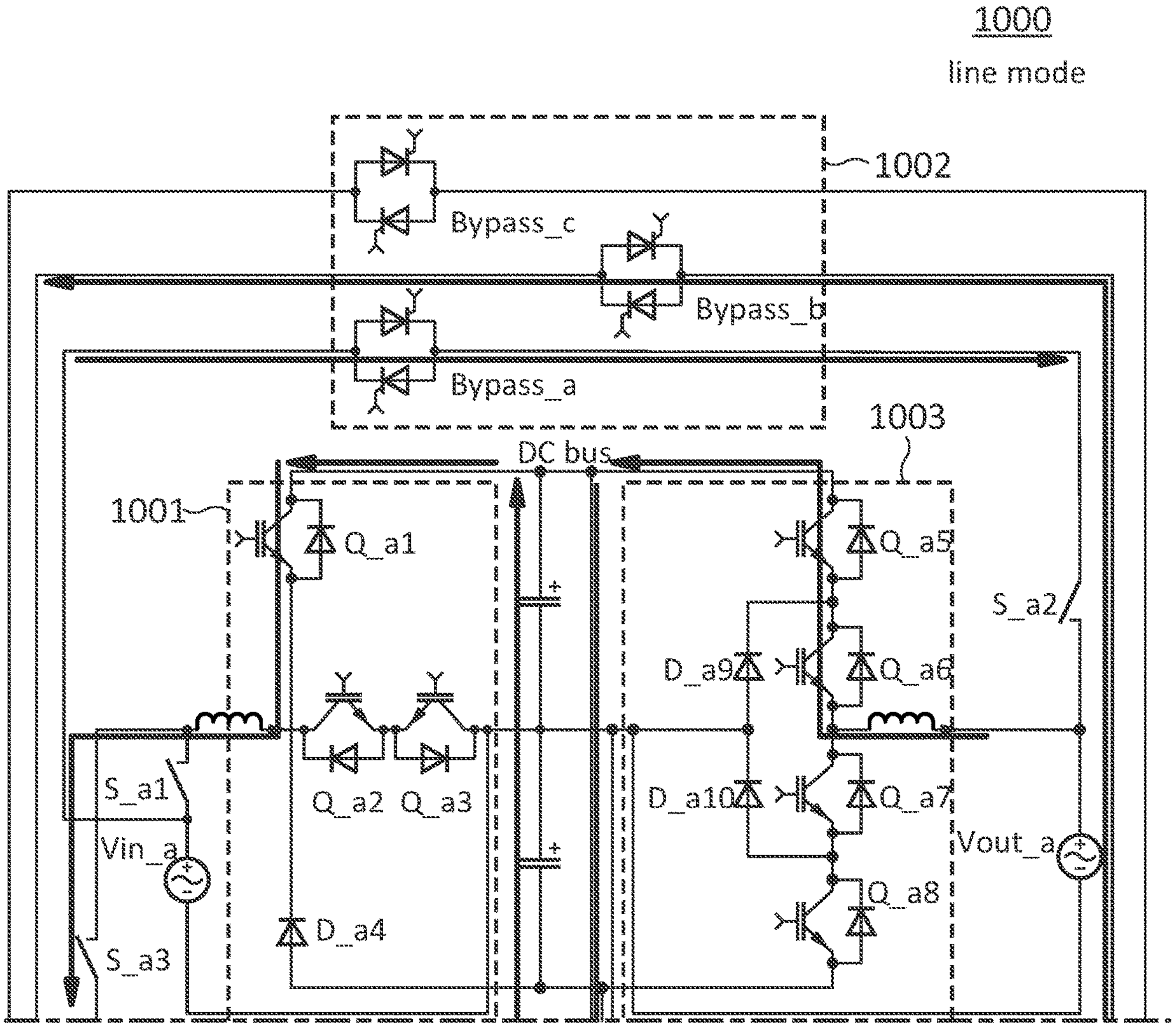
FIG. 10B and FIG. 10C show a detailed circuit diagram of a power supply system in line mode.
Figure 10C:
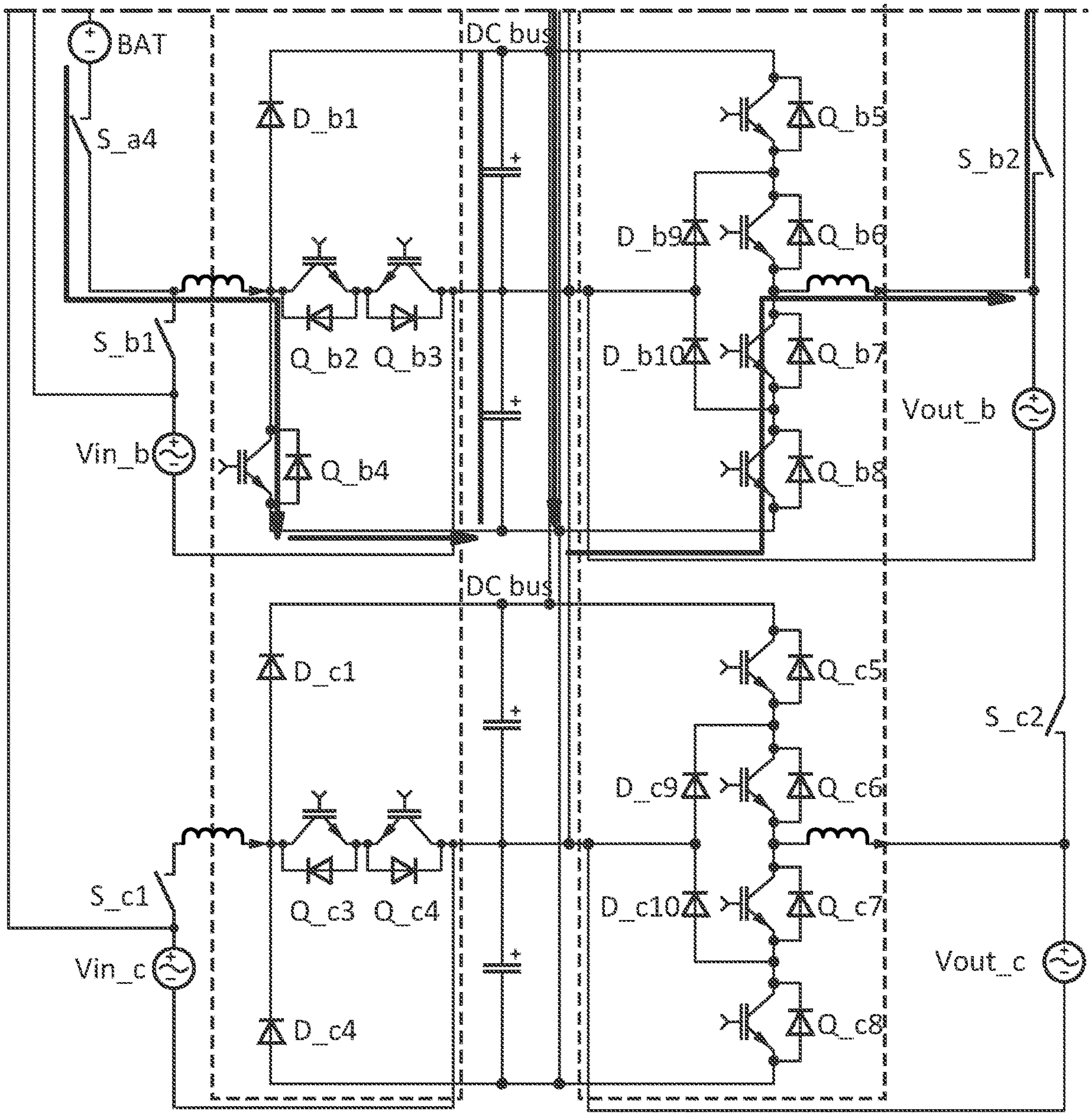

FIG. 10A shows an arrangement of FIGS. 10B and 10C, which are conjoined as shown in FIG. 10A. FIG. 10B and FIG. 10C show a detailed circuit diagram of a power supply system 1000 in line mode.

Figure 10D:
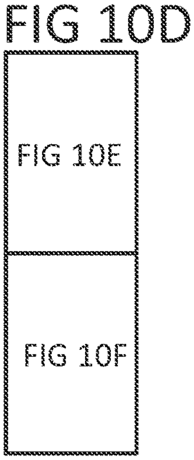
FIG. 10D shows an arrangement of FIGS. 10E and 10F, which are conjoined as shown in FIG. 10D.
Figure 10E:
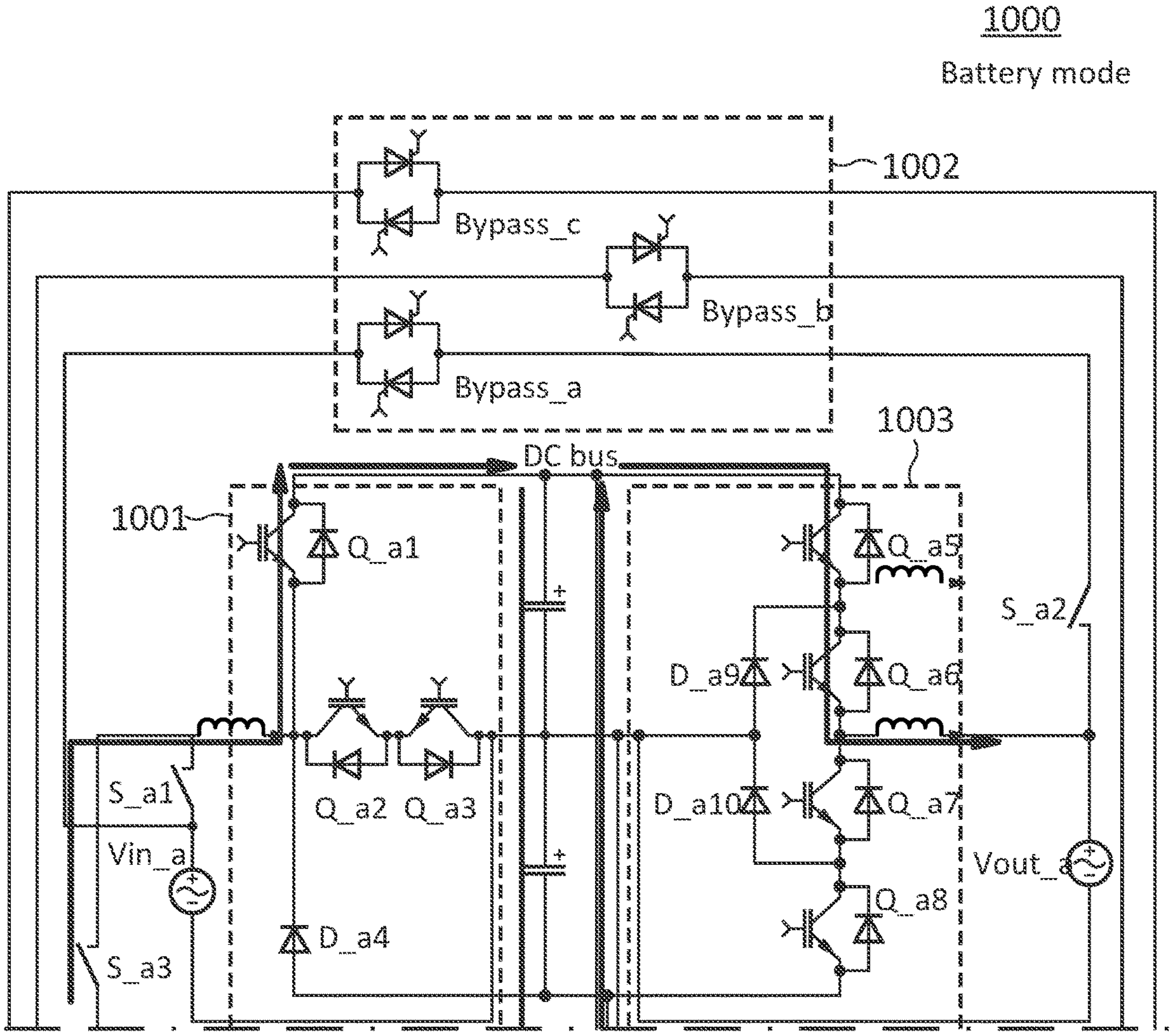
FIG. 10E and FIG. 10F show a detailed circuit diagram of a power supply system in battery mode.
Figure 10F:
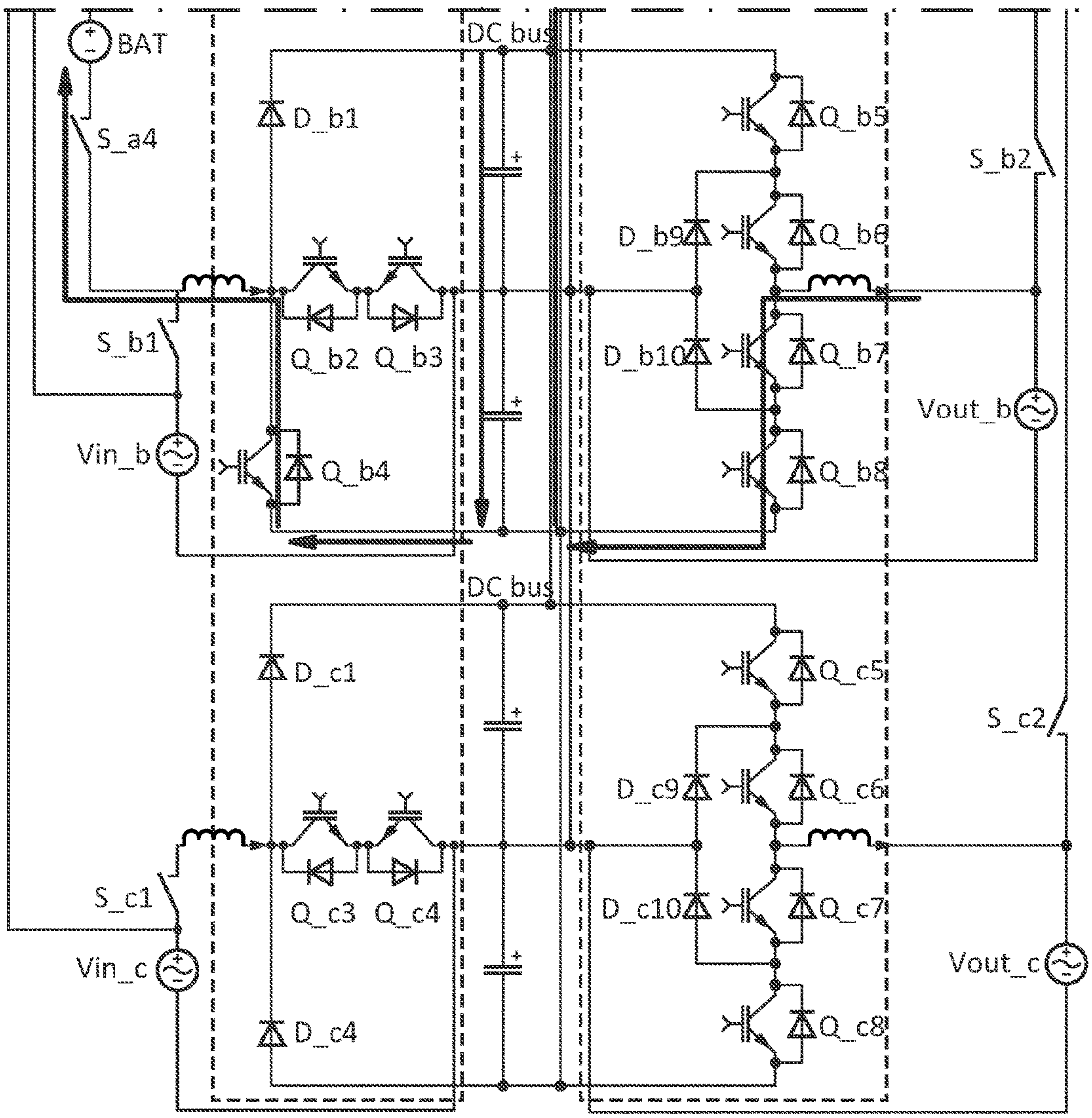

FIG. 10D shows an arrangement of FIGS. 10E and 10F, which are conjoined as shown in FIG. 10D. FIG. 10E and FIG. 10F show a detailed circuit diagram of the power supply system 1000 in battery mode.

Figure 10G:
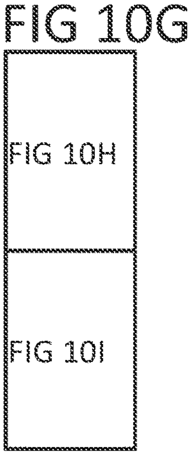
FIG. 10G shows an arrangement of FIGS. 10H and 10I, which are conjoined as shown in FIG. 10G.
Figure 10H:
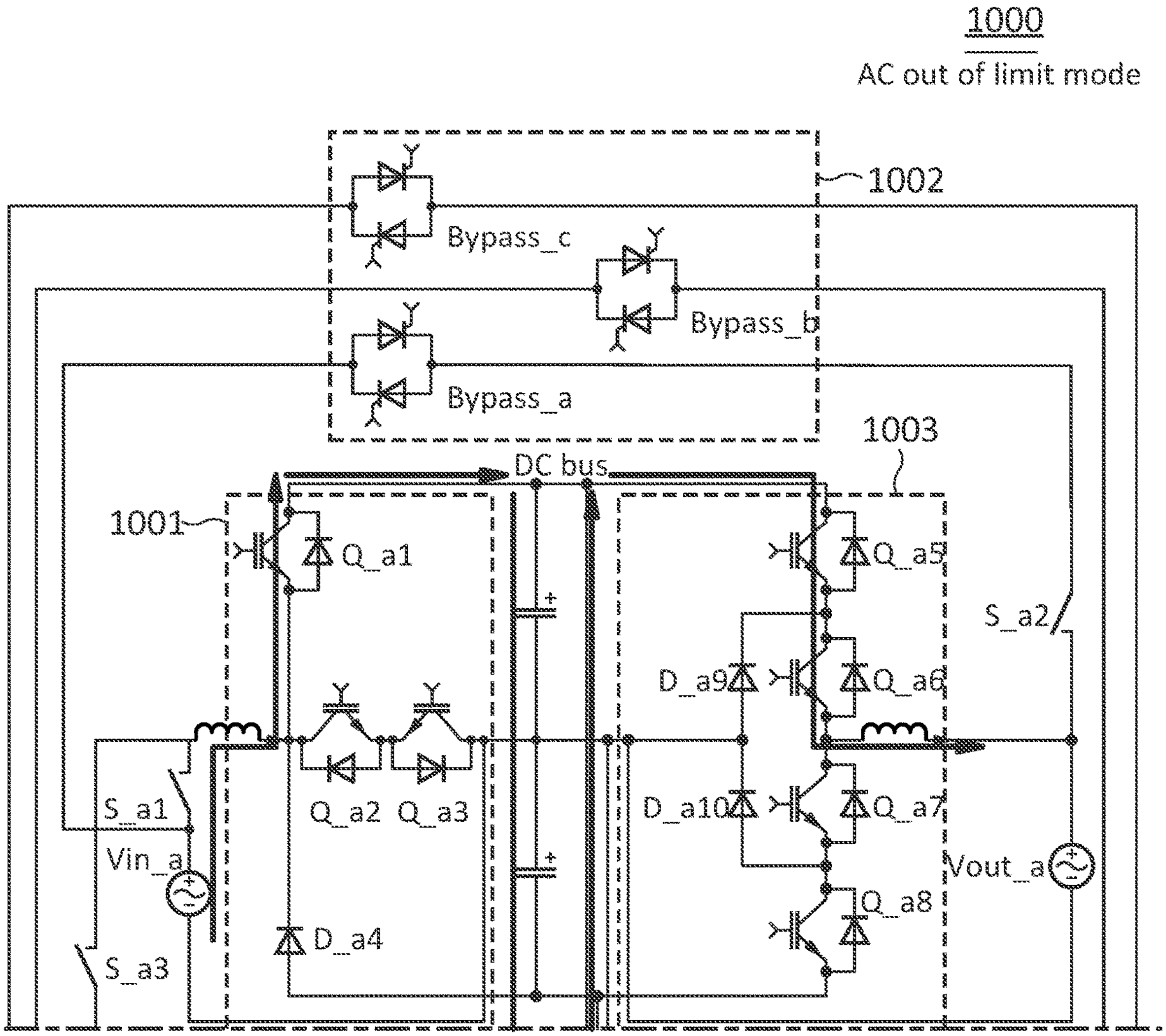
Figure 10I:
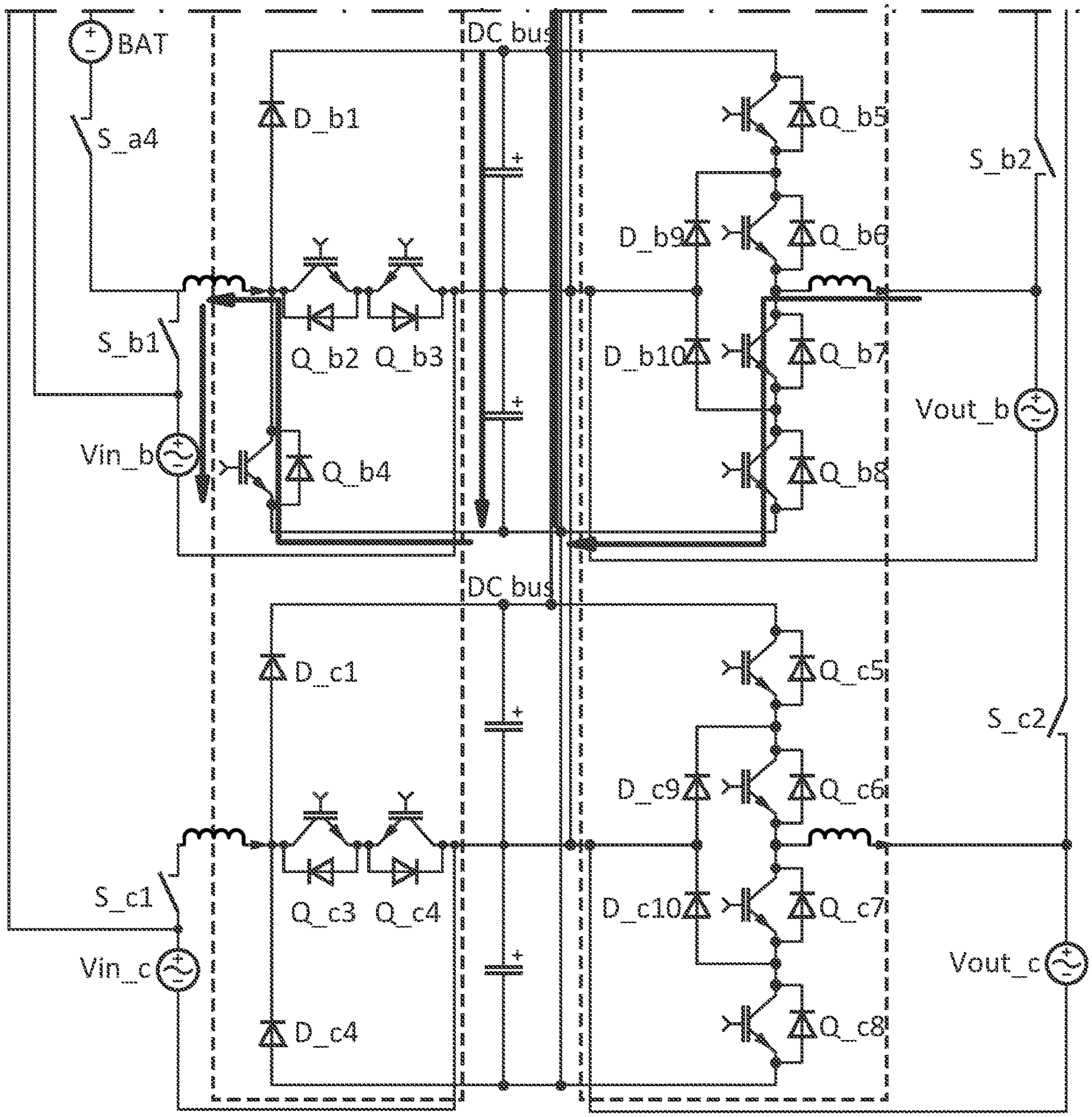

FIG. 10G shows an arrangement of FIGS. 10H and 10I, which are conjoined as shown in FIG. 10G. FIG. 10E and FIG. 10F show a detailed circuit diagram of the power supply system 1000 in an AC out of limit mode.

Circuit structures of a rectification and charging-discharging module 1001 in the power supply system 1000 are the same as that of the rectification and charging-discharging module 701 shown in FIG. 7. A circuit structure of a bypass module 1002 of the power supply system 1000 is the same as that of the bypass module 702 shown in FIG. 7. A circuit structure of a conversion module 1003 of the power supply system 1000 is the same as that of the conversion module 903 shown in FIGS. 9B and 9C.

As shown in FIGS. 10B and 10C, in the line mode, switches S_a1, S_b1 and S_c1 are switched off. Switches S_a2, S_b2, S_c2, S_a3 and S_a4 are switched on. Current flow paths are as shown by arrows in the Figure. An AC input current flows to the conversion module 1003 via the bypass module 1002. The conversion module 1003 rectifies the AC current and charges a capacitor of the DC bus. The AC input is directly from the bypass module 1002 to the outputs Vout_a, Vout_b and Vout_c. Then, the capacitor of DC bus charges the battery BAT through the rectification and charging-discharging module 1001.

As shown in FIGS. 10E and 10F, in the battery mode, switches S_a1, S_b1, S_c1, S_a2, S_b2 and S_c2 are switched off, and switches S_a3 and S_a4 are switched on. Current flow paths are as shown by arrows in the Figure. The rectification and charging-discharging module 1001 discharges the battery BAT. The DC current flows from the rectification and charging-discharging module 1001 to the conversion module 1003. The conversion module 1003 converts the DC current into an AC current and the converted AC current flows to the outputs Vout_a, Vout_b and Vout_c.

As shown in FIGS. 10H and 10I, in the AC out of limit mode, switches S_a1, S_b1, and S_c1 are switched on, and switches S_a2, S_b2, S_c2, S_a3 and S_a4 are switched off. Current flow paths are as shown by arrows in the Figure. The AC input current flows to the rectification and charging-discharging module 1001. The conversion module 1003 converts the rectified DC current received from the rectification and charging-discharging module 1001 into an AC current. The converted AC current flows to the outputs Vout_a, Vout_b and Vout_c.

Figure 11A:
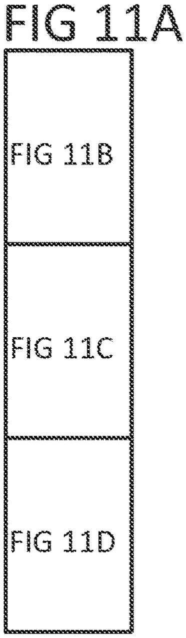
FIG. 11A shows an arrangement of FIGS. 11B, 11C, and 11D, which are conjoined as shown in FIG. 11A.
Figure 11B:
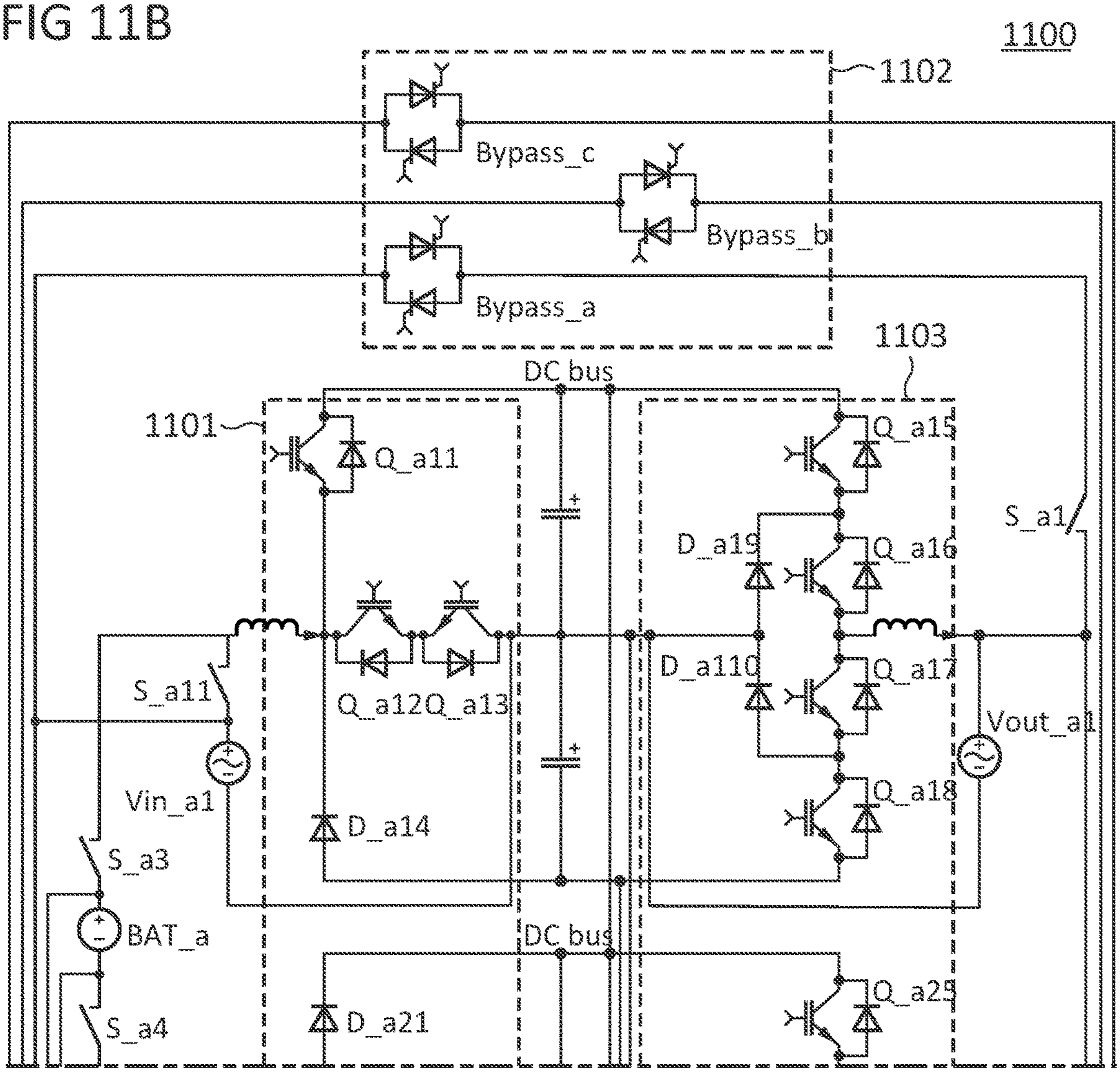
FIGS. 11B, 11C, and 11D show a detailed circuit diagram of a power supply system according to a fourth implementation of the present disclosure.
Figure 11C:
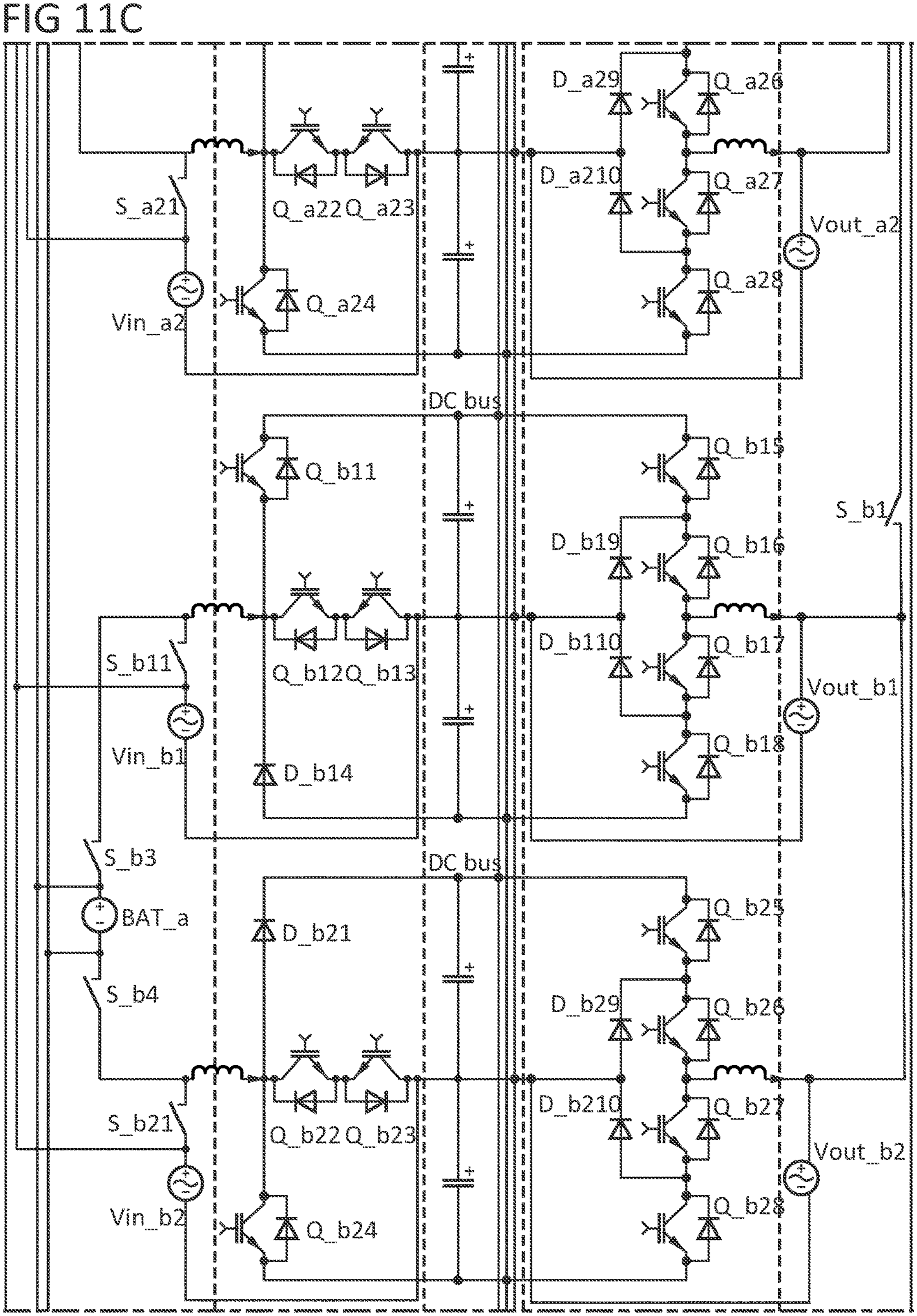
Figure 11D:
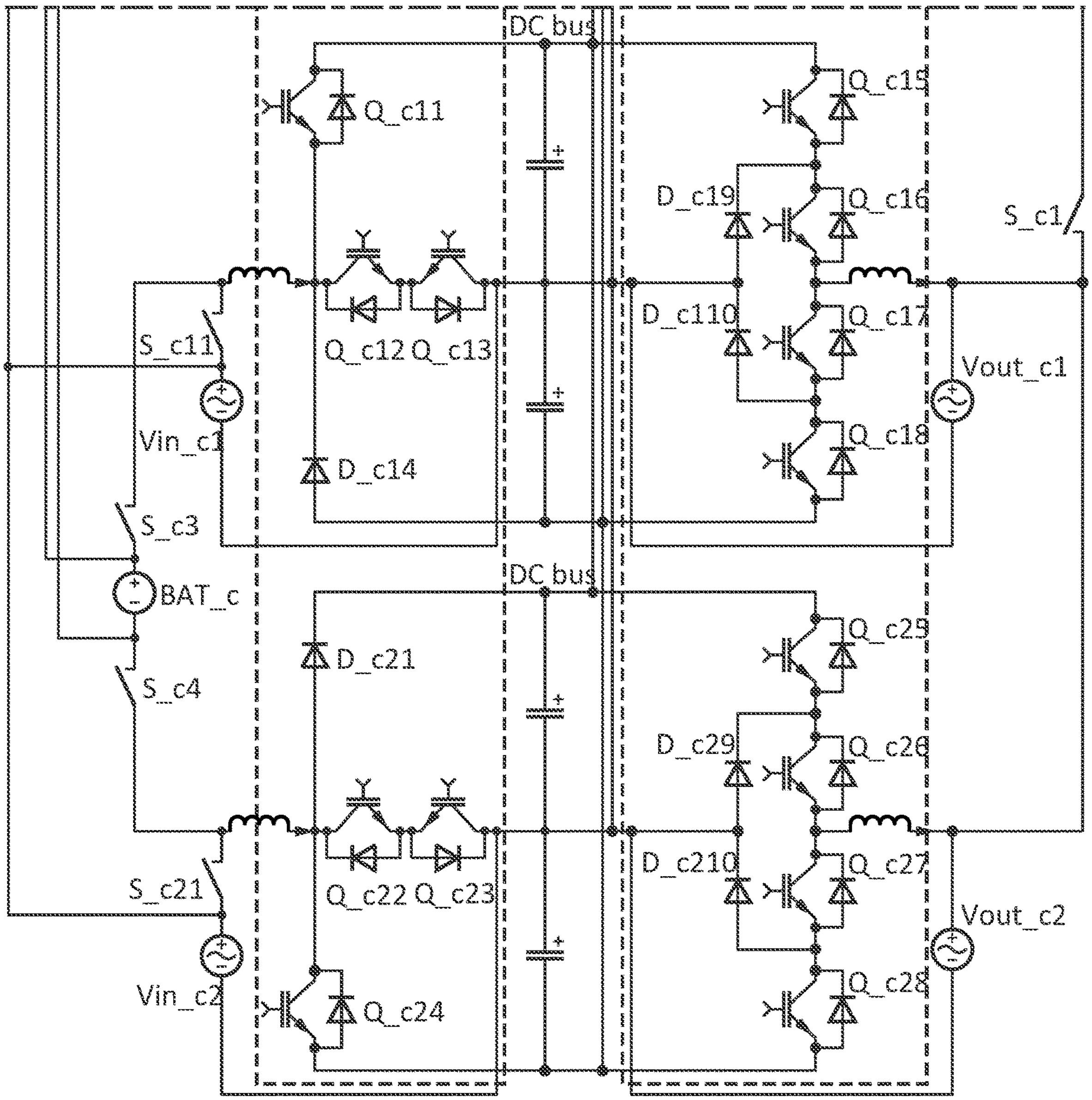

FIG. 11A shows an arrangement of FIGS. 11B, 11C, and 11D, which are conjoined as shown in FIG. 11A. FIGS. 11B, 11C, and 11D show a detailed circuit diagram of a power supply system 1100 according to a fourth implementation of the present disclosure.

Figure 11E:
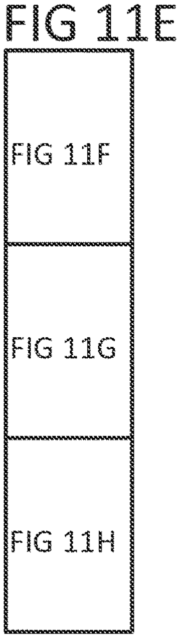
FIG. 11E shows an arrangement of FIGS. 11F, 11G, and 11H, which are conjoined as shown in FIG. 11E.
Figure 11F:
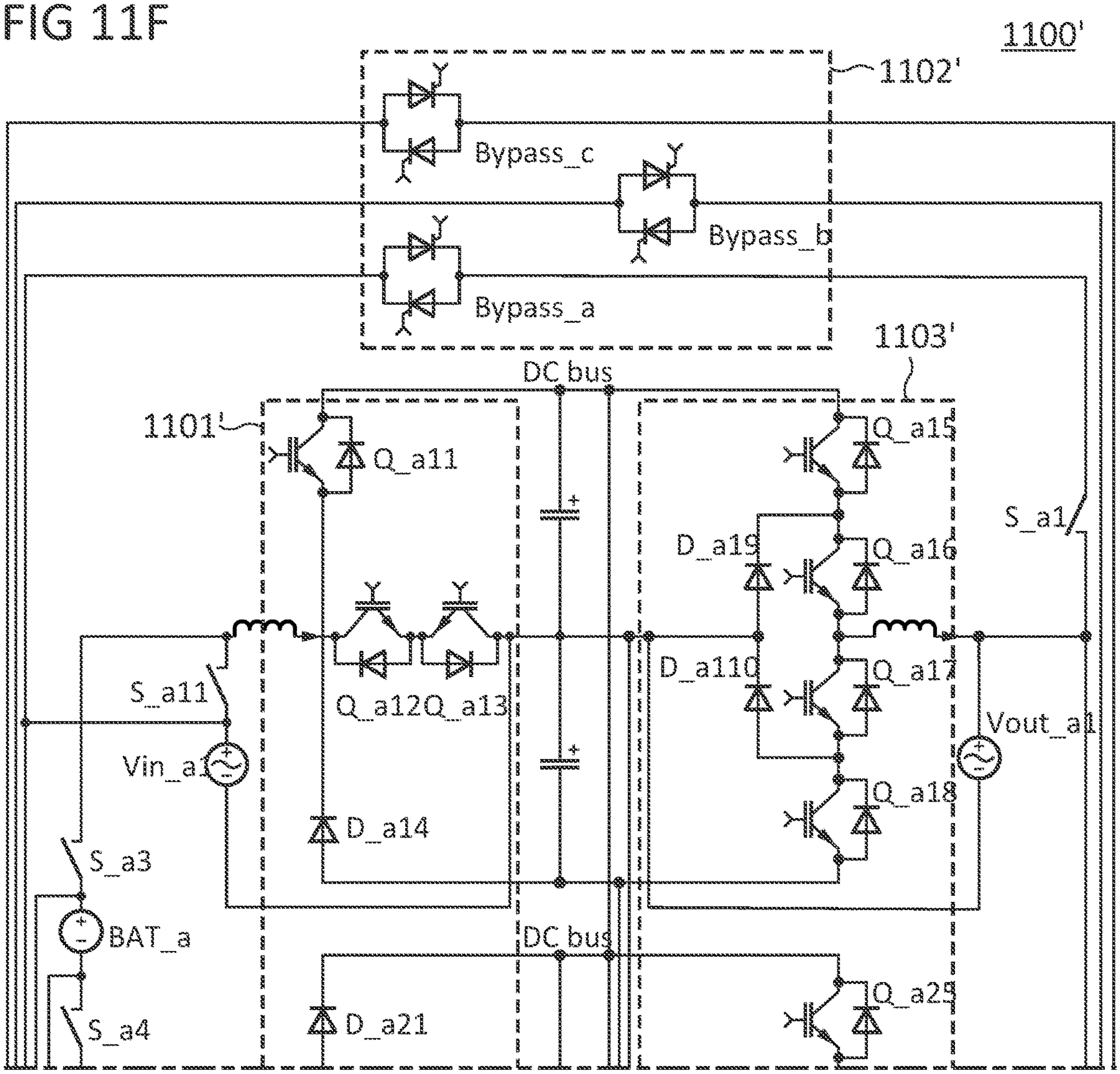
FIGS. 11F, 11G, and 11H show a detailed circuit diagram of a power supply system according to a fourth implementation of the present disclosure.
Figure 11G:
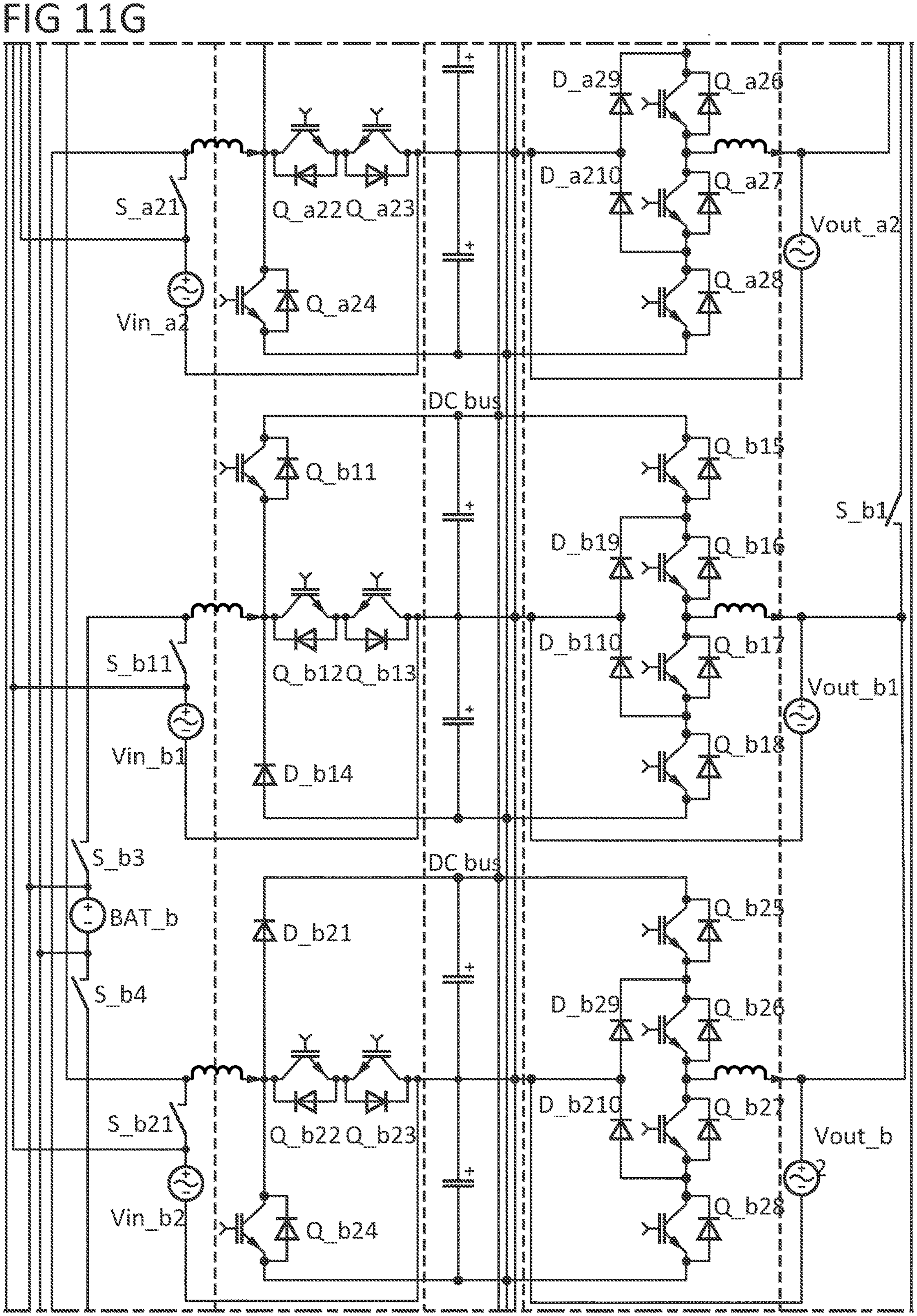
Figure 11H:
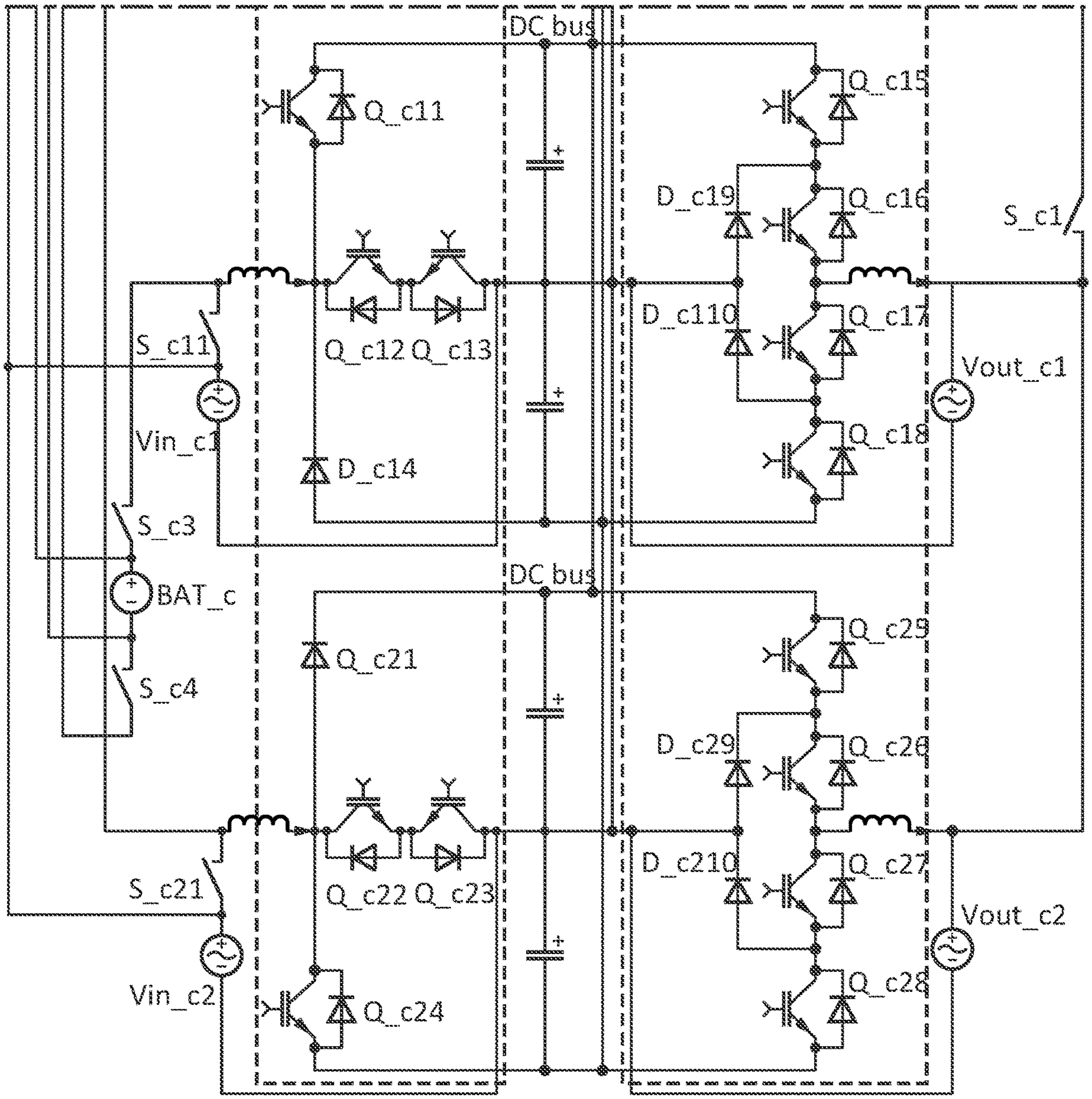

FIG. 11E shows an arrangement of FIGS. 11F, 11G, and 11H, which are conjoined as shown in FIG. 11E. FIGS. 11F, 11G, and 11H show a detailed circuit diagram of a power supply system 1100' according to a fourth implementation of the present disclosure.

FIGS. 11B, 11C, and 11D show a detailed circuit diagram of a power supply system according to a fourth implementation of the present disclosure. As shown in FIGS. 11B, 11C, and 11D, each of a rectification and charging-discharging module 1101 and a conversion module 1103 of the power supply system 1100 includes six switch units. Circuit structures of the six switch units of the rectification and charging-discharging module 1101 are the same as that of the switch units of the rectification and charging-discharging module 701 shown in FIG. 7. Circuit structures of the six switch units of the conversion module 1103 are the same as that of the switch units of the conversion module 903 shown in FIGS. 9B and 9C. A battery BAT_a is coupled between a first switch unit and a second switch unit of the rectification and charging-discharging module 1101, a battery BAT_b is coupled between a third switch unit and a fourth switch unit, and a battery BAT_c is coupled between a fifth switch unit and a sixth switch unit.

FIGS. 11F, 11G, and 11H is a detailed circuit diagram of a variant of the power supply system in FIGS. 11B, 11C, and 11D. A power supply system 1100' in FIGS. 11F, 11G, and 11H is different from the power supply system 1100 in FIGS. 11B, 11C, and 11D in that the battery BAT_a is coupled between the first switch unit and the fourth switch unit of the rectification and charging-discharging module 1101', the battery BAT_b is coupled between the third switch unit and the sixth switch unit, and the battery BAT_c is coupled between the second switch unit and the fifth switch unit.

A bypass module 1102 in FIGS. 11B, 11C, and 11D and a bypass module 1102' in FIGS. 11F, 11G, and 11H are the same as the bypass module 702 shown in FIG. 7.

It should be understood that although each of the rectification and charging-discharging module and the conversion module of the power supply system shown in FIGS. 11B, 11C, and 11D and FIGS. 11F, 11G, and 11H includes six switch units, the present disclosure is not limited to this. More or fewer switch units may be arranged as needed.

It should also be understood that the switch units of the rectification and charging-discharging module and the conversion module of the power supply system shown in FIGS. 11B, 11C, and 11D and FIGS. 11F, 11G, and 11H may have other circuit structures, for example (but not limited to), any combination of the detailed circuit structures shown in FIG.

4A, FIG. 4B, FIG. 5A, FIG. 5B, FIG. 8A, FIG. 8B, FIGS. 9B and 9C and FIGS. 9E and 9F.

Figure 12:
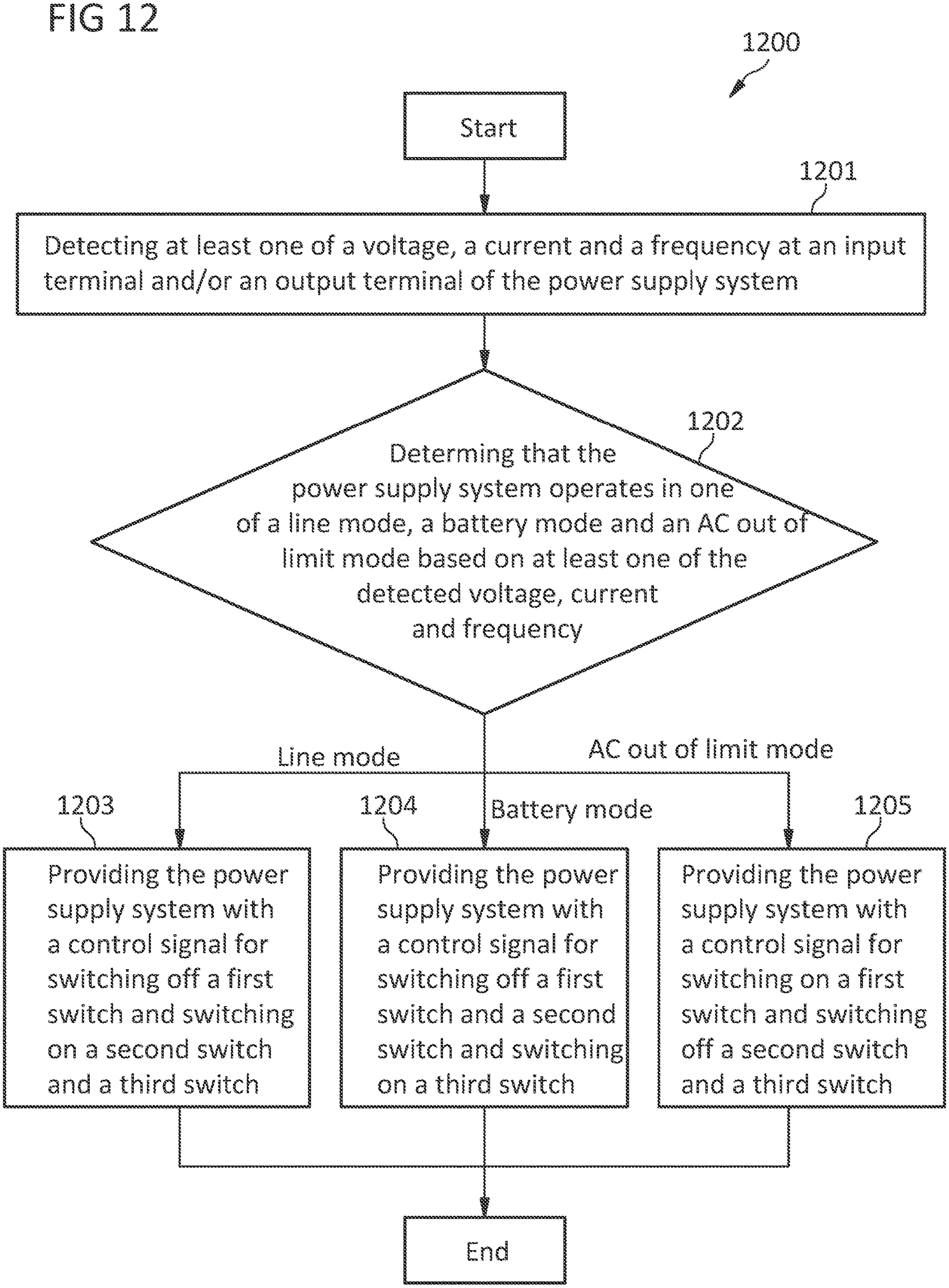
FIG. 12 is a flowchart of a method of operating ae power supply system according to an implementation of the present disclosure.

FIG. 12 is a flowchart of a method of operating a power supply system according to an implementation of the present disclosure. It should be noted that a method 1200 in FIG. 12 may be performed by the power supply system according to the implementations of the present disclosure. The method 1200 of operating a power supply system in FIG. 12 is described below with reference to the power supply system 200 in FIG. 2.

First, in step 1201, at least one of a voltage, a current and a frequency at the input terminal and/or output terminal of the power supply system is detected. More particularly, in this implementation, the detection circuit 208 of the power supply system 200 in FIG. 2 detects the voltage/current/frequency at the input terminal 206 and the output terminal 207.

Next, in step 1202, it is determined that the power supply system operates in one of the line mode, the battery mode and the AC out of limit mode based on at least one of the detected voltage, current and frequency.

More particularly, in this implementation, for example, in a case that the AC input meets a load power supply requirement or a specification of the power supply system, the controller 204 determines that the power supply system 200 operates in the line mode. In the absence of the AC input, the controller 204 determines that the power supply system 200 operates in the battery mode. In the absence of the AC input, the controller 204 determines that the power supply system 200 operates in the battery mode. In a case that the voltage/current/frequency of the AC input does not meet a load power supply requirement, the controller 204 determines that the power supply system 200 operates in the AC out of limit mode.

Next, in step 1203, in a case of determining that the power supply system operates in the line mode, a control signal for switching off the first switch and switching on the second switch and the third switch is provided to the power supply system.

More particularly, in this implementation, the controller 204, in a case of determining that the power supply system 200 operates in the line mode, transmits a control signal for switching off the switch S21 and switching on the switches S22 and S23. In this case, the bypass module 202 operates and supplies power to the load. The conversion module 203 rectifies the AC current or voltage received from the bypass module 202 and charges the capacitor of the DC bus. The capacitor of the DC bus charges the battery 205 through the rectification and charging-discharging module 201.

In step 1204, in a case of determining that the power supply system operates in the battery mode, a control signal for switching off the first switch and the second switch and switching on the third switch is provided to the power supply system.

More particularly, in this implementation, the controller 204, in a case of determining that the power supply system 200 operates in the battery mode, transmits a control signal for switching off the switches S21 and S23 and switching on the switch S22. In this case, the bypass module 202 does not operate, the rectification and charging-discharging module 201 discharges the battery 205. The conversion module 203 converts the DC current or voltage received from the rectification and charging-discharging module 201 into an AC current or voltage.

In step 1205, in a case of determining that the power supply system operates in the AC out of limit mode, a control signal for switching on the first switch and switching off the second switch and the third switch is provided to the power supply system.

More particularly, in this implementation, the controller 204, in a case of determining that the power supply system 200 operates in the AC out of limit mode, transmits a control signal for switching on the switch S21 and switching off the switches S22 and S23. In this case, the bypass module 202 does not operate. The rectification and charging-discharging module 201 rectifies the AC current or voltage received via the input terminal 206. The conversion module 203 converts the DC current or voltage received from the rectification and charging-discharging module 201 into an AC current or voltage.

It should be noted that terms of "include", "comprise" or any other variants are intended to be non-exclusive. Therefore, a process, a method, an article or a device including multiple elements includes not only the elements but also other elements that are not enumerated, or also include the elements inherent for the process, the method, the article or the device. Unless expressively limited otherwise, the statement "comprising one . . . " does not exclude the case that other similar elements may exist in the process, the method, the article or the device.

It should also be pointed out that in the described implementations, any direct electrical connection or coupling between elements, i.e, connection or coupling without an intermediate element may be replaced by indirect connection or coupling, i.e, connection or coupling including one or more additional intermediate elements, and vice versa, as long as a general purpose of connection or coupling such as providing some signal, some information or some control is substantially maintained. In other words, as long as the general purpose and function of the connection or coupling remain substantially unchanged, the connection and coupling may be modified.

Aspects

At least some implementations are defined by the following aspects.

Aspect 1. A power supply system, comprising:

an input terminal receiving an alternating current input;

an output terminal connected to a load;

a first switch (S21), a second switch (S23) and a third switch (S22);

a rectification and charging-discharging module with one end coupled to the input terminal through the first switch and coupled to a battery through the third switch;

a conversion module with one end coupled to the other end of the rectification and charging-discharging module via a direct current bus, and the other end coupled to the output terminal; and a bypass module with one end coupled to the input terminal, and the other end coupled to the output terminal through the second switch, wherein the power supply system operates in one of a line mode, a battery mode and an alternating current out of limit mode by switching the first switch, the second switch and the third switch on or off.

Aspect 2. The power supply system according to Aspect 1, wherein in the line mode, the first switch is switched off, and the second switch and the third switch are switched on;

in the battery mode, the first switch and the second switch are switched off, and the third switch is switched on; and in the alternating current out of limit mode, the first switch is switched on, and the second switch and the third switch are switched off.

Aspect 3. The power supply system according to Aspect 2, wherein:

in the line mode, the bypass module operates and supplies power to the load, the conversion module rectifies an alternating current or voltage received from the bypass module and charges the direct current bus, and the direct current bus charges the battery through the rectification and charging-discharging module;

in the battery mode, the bypass module does not operates, the rectification and charging-discharging module discharges the battery, and the conversion module converts a direct current or voltage received from the rectification and charging-discharging module into an alternating current or voltage; and in the alternating current out of limit mode, the bypass module does not operate, the rectification and charging-discharging module rectifies an alternating current or voltage received via the input terminal, and the conversion module converts a direct current or voltage received from the rectification and charging-discharging module into an alternating current or voltage. Aspect 4. The power supply system according to Aspect 3, wherein the rectification and charging-discharging module comprises two switch units between which the battery is coupled; and wherein the conversion module comprises two switch units coupled, respectively, to the two switch units of the rectification and charging-discharging module.

Aspect 5. The power supply system according to Aspect 4, wherein, in the line mode and the battery mode, the two switch units of the rectification and charging-discharging module are coupled between one of a positive electrode and a negative electrode of the battery and the direct current bus, respectively; and wherein in the alternating current out of limit mode, the two switch units of the rectification and charging-discharging module are connected in parallel.

Example 6. The power supply system according to Aspect 4, further comprising a fourth switch (S_a4), wherein a positive electrode of the battery is coupled between the two switch units of the rectification and charging-discharging module through the third switch, and a negative electrode of the battery is coupled between the two switch units of the rectification and charging-discharging module through the fourth switch.

Aspect 7. The power supply system according to Aspect 6, wherein each of the two switch units of the rectification and charging-discharging module comprises three transistors and one diode, a second transistor (Q_a2, Q_b2) and a third transistor (Q_a3, Q_b3) of the three transistors being connected in reverse series, one end of a first transistor (Q_a1, Q_b4) of the three transistors and one end of the diode (D_a4, D_b1) being connected to the second transistor, and the other end of the first transistor and the other end of the diode being connected to the direct current bus; and wherein the positive electrode and the negative electrode of the battery are respectively coupled to a cathode of the diode of one of the two switch units of the rectification and charging-discharging module and an anode of the diode of the other one of the two switch units of the rectification and charging-discharging module.

Aspect 8. The power supply system according to Aspect 6, wherein each of the two switching units of the rectification and charging-discharging module comprises four transistors and two diodes, a first transistor (Q_a1, Q_b4), a second transistor (Q_a2, Q_b3) and a third transistor (Q_a3, Q_b2) of the four transistors and a first diode (D_a4, D_b1) of the two diodes being connected in series, and a fourth transistor (Q_a9, Q_b9) of the four transistors and a second diode (D_a6, D_b5) of the two diodes being connected in series and being connected in parallel with the second transistor and the third transistor; and wherein the positive electrode and the negative electrode of the battery are respectively coupled between a cathode of the second diode of one of the two switch units of the rectification and charging-discharging module and an anode of the second diode of the other one of the two switch units of the rectification and charging-discharging module.

Aspect 9. The power supply system according to Aspect 6, wherein each of the two switch units of the rectification and charging-discharging module comprises three transistors and three diodes, a first transistor (Q_a1, Q_b4), a second transistor (Q_a2, Q_b3) and a third transistor (Q_a3, Q_b2) of the three transistors and a first diode (D_a4, D_b1) of the three diodes being connected in series, and a second diode (D_a5, D_b5) and a third diode (D_a6, D_b6) of the three diodes being connected in series and being connected in parallel with the second transistor and the third transistor; and wherein the positive electrode and the negative electrode of the battery are respectively coupled between an intermediate node between the second transistor and the third transistor of one of the two switch units of the rectification and charging-discharging module and an intermediate node between the second transistor and the third transistor of the other one of the two switch units of the rectification and charging-discharging module.

Aspect 10. The power supply system according to Aspect 6, wherein:

each of the two switch units of the rectification and charging-discharging module comprises two transistors connected in series, the battery being coupled between intermediate nodes between respective two transistors of the two switch units of the rectification and charging-discharging module, or each of the two switch units of the rectification and charging-discharging module comprises a transistor and a diode connected in series, a positive electrode and a negative electrode of the battery being coupled, respectively, between a cathode of the diode of one of the two switch units of the rectifier and charging-discharging module and an anode of the diode of the other one of the two switch units of the rectifier and charging-discharging module.

Aspect 11. The power supply system according to Aspect 3, wherein the rectification and charging-discharging module comprises a first switch unit, a second switch unit and a third switch unit that are connected, respectively, to three phases of the alternating current input;

wherein the conversion module comprises three switch units coupled, respectively, to the first switch unit, the second switch unit and the third switch unit of the rectification and charging-discharging module via the direct current bus; and the bypass module comprises three switches (Bypass_a, Bypass_b, Bypass_c) connected, respectively, to the three phases.

Aspect 12. The power supply system according to Aspect 11, further comprising a fourth switch (S_a4), wherein the positive electrode of the battery is coupled to one of the two switch units of the rectification and charging-discharging module through the third switch, and the negative electrode of the battery is coupled to the other one of the two switch units of the rectification and charging-discharging module through the fourth switch (S_a4).

Aspect 13. The power supply system according to Aspect 12, wherein each of the first switch unit and the second switch unit comprises three transistors and one diode (D_a4, D_b1), a second transistor (Q_a2, Q_b2) and a third transistor (Q_a3, Q_b3) of the three transistors being connected in reverse series, and one end of a first transistor (Q_a1, Q_b4) of the three transistors and one end of the diode being connected to the second transistor, and the other end of the first transistor and the other end of the diode being connected to the direct current bus, the positive electrode of the battery being coupled to a cathode of the diode of one of the first switch unit and the second switch unit, and the negative electrode of the battery being coupled to an anode of the diode of the other one of the first switch unit and the second switch unit; and wherein the third switch unit comprises two transistors (Q_c2, Q_c3) connected in reverse series, and two diodes (D_c1, D_c4), one end of each of the two diodes being connected to the two transistors and the other end connected to the direct current bus.

Aspect 14. The power supply system according to Aspect 12, wherein each of the first switch unit and the second switch unit comprises four transistors and two diodes, a first transistor (Q_a1, Q_b4), a second transistor (Q_a2, Q_b3) and a third transistor (Q_a3, Q_b2) of the four transistors and a first diode (D_a4, D_b1) of the two diodes being connected in series, and a fourth transistor (Q_a9, Q_b9) of the four transistors and a second diode (D_a6, D_b5) of the two diodes being connected in series and connected in parallel with the second transistor and the third transistor, the positive electrode of the battery being coupled to a cathode of the diode of one of the first switch unit and the second switch unit, and the negative electrode of the battery being coupled to an anode of the diode of the other one of the first switch unit and the second switch unit; and wherein the third switch unit comprises two transistors (Q_c2, Q_c3) and four diodes, the two transistors and a first diode (D_c1) and a second diode (D_c4) of the four diodes being connected in series and being connected in parallel with a third diode (D_c5) and a fourth diode (D_c6) that are connected in series.

Aspect 15. The power supply system according to Aspect 12, wherein each of the first switch unit and the second switch unit comprises three transistors and three diodes, a first transistor (Q_a1, Q_b4), a second transistor (Q_a2, Q_b3) and a third transistor (Q_a3, Q_b2) of the three transistors and a first diode (D_a4, D_b1) of the three diodes being connected in series, and a second diode (D_a5, D_b5) and a third diode (D_a6, D_b6) of the three diodes being connected in series and being connected in parallel with the second transistor and the third transistor, the positive electrode and the negative electrode of the battery being coupled between intermediate nodes between the respective second and third transistors of the first switch unit and the second switch unit; and wherein the third switch unit comprises two transistors (Q_c2, Q_c3) and four diodes, the two transistors and a first diode (D_c1) and a second diode (D_c4) of the four diodes being connected in series and being connected in parallel with a third diode (D_c5) and a fourth diode (D_c6).

Aspect 16. The power supply system according to Aspect 12, wherein each of the first switch unit, the second switch unit and the third switch unit comprises two transistors connected in series, the battery being coupled between an intermediate node between the two transistors of the first switch unit and an intermediate node between the two transistors of the second switch unit, or each of the first switch unit and the second switch unit comprises a transistor and a diode connected in series, and the third switch unit comprises two diodes connected in series, the positive electrode of the battery being coupled to a cathode of the diode of one of the first switch unit and the second switch unit, and the negative electrode of the battery being coupled to an anode of the diode of the other one of the first switch unit and the second switch unit.

Aspect 17. The power supply system according to Aspect 12, wherein the first switch unit is connected to a first phase of the three phases of the alternating current input, the second switch unit is connected to a second phase of the three phases, and the third switch unit is connected to a third phase of the three phases, wherein the rectification and charging-discharging module further comprises a fourth switch unit connected to the first phase, a fifth switch unit connected to the second phase, and a sixth switch unit connected to the third phase, wherein the power supply system comprises three batteries, a first battery of the three batteries being coupled between the first switch unit and the fourth switch unit or the fifth switch unit, a second battery of the three batteries being coupled between the second switch unit and the fifth switch unit or sixth switch unit, and a third battery of the three batteries being coupled between the third switch unit and the sixth switch unit or the fourth switch unit, and wherein the conversion module further comprises three further switch units respectively coupled to the fourth switch unit, the fifth switch unit and the sixth switch unit of the rectification and charging-discharging module via the direct current bus.

Aspect 18. The power supply system according to Aspect 11, wherein each of the three switches of the bypass module comprises two thyristors connected in reverse parallel.

Aspect 19. The power supply system according to Aspect 1, further comprising a controller configured to detect at least one of a voltage, a current, and a frequency at the input terminal and/or the output terminal to provide the power supply system with a control signal for switching corresponding switches and transistors in the power supply system on or off, the control signal causing the power supply system to switch over among the line mode, the battery mode and the alternating current out of limit mode.

Aspect 20. A method of operating the power supply system according to Aspect 1, comprising:

detecting at least one of a voltage, a current and a frequency at the input terminal and/or output terminal of the power supply system;

determining that the power supply system operates in one of the line mode, the battery mode and the alternating current out of limit mode based on at least one of the detected voltage, current and frequency;

providing the power supply system with a control signal for switching off the first switch and switching on the second switch and the third switch, in a case of determining that the power supply system operates in the line mode;

providing the power supply system with a control signal for switching off the first switch and the second switch and switching on the third switch, in a case of determining that the power supply system operates in the battery mode; and providing the power supply system with a control signal for switching on the first switch and switching off the second switch and the third switch, in a case of determining that the power supply system operates in the alternating current out of limit mode.

Although the implementations of the present disclosure have been described above in detail with reference to the drawings, it should be understood that the above-described implementations are merely used for illustrating the present disclosure and are not intended to limit the present disclosure. Those skilled in the art can make various modifications and variations to the above-described implementations without departing from the substance and scope of the present disclosure. Accordingly, the scope of the present disclosure is defined only by the appended claims and their equivalents.

The invention claimed is:

1. A power supply system, comprising:

an input terminal configured to receive an alternating current input;

an output terminal configured to be connected to a load;

a first switch, a second switch, a third switch, a fourth switch, and a fifth switch;

a rectification and charging-discharging module comprising a first terminal, a second terminal, and a third terminal, wherein the first terminal is coupled to the input terminal through the first switch, and wherein the third terminal is configured to be coupled to a battery through the third switch;

a conversion module with a fourth terminal and a fifth terminal, wherein the fourth terminal is coupled to the second terminal of the rectification and charging-discharging module via a direct current bus, and the fifth terminal is coupled to the output terminal; and a bypass module comprising a sixth terminal and a seventh terminal, wherein the sixth terminal is coupled to the input terminal, and the seventh terminal is coupled to the output terminal through the second switch, wherein the power supply system is configured to operate in one of a line mode, a battery mode, or an alternating current out of limit mode by switching the first switch, the second switch, and the third switch on or off, and wherein a positive electrode of the battery is configured to be connected to the first switch through the fourth switch, and a negative electrode of the battery is connected to the second switch through the fifth switch.

2. The power supply system according to claim 1, wherein:

in the line mode, the first switch is switched off, and the second switch and the third switch are switched on;

in the battery mode, the first switch and the second switch are switched off, and the third switch is switched on; and in the alternating current out of limit mode, the first switch is switched on, and the second switch and the third switch are switched off.

3. The power supply system according to claim 2, wherein, in a state in which the load is connected to the output terminal and the battery is connected to the third terminal:

in the line mode, the bypass module is configured to operate and supply power to the load, the conversion module is configured to rectify an alternating current or voltage received from the bypass module and charge the direct current bus, and the direct current bus is configured to charge the battery through the rectification and charging-discharging module;

in the battery mode, the bypass module is disabled, the rectification and charging-discharging module is configured to discharge the battery, and the conversion module is configured to convert a direct current or voltage received from the rectification and charging-discharging module into an alternating current or voltage; and in the alternating current out of limit mode, the bypass module is disabled, the rectification and charging-discharging module is configured to rectify an alternating current or voltage received via the input terminal, and the conversion module is configured to convert a direct current or voltage received from the rectification and charging-discharging module into an alternating current or voltage.

4. The power supply system according to claim 1, further comprising:

a controller configured to detect at least one of a voltage, a current, or a frequency at the input terminal or the output terminal to provide the power supply system with a control signal for switching corresponding switches and transistors in the power supply system on or off, the control signal causing the power supply system to switch between the line mode, the battery mode, and the alternating current out of limit mode.

5. The power supply system according to claim 1, wherein the third switch comprises two transistors connected in reverse series, and two diodes, and wherein a first diode terminal of each of the two diodes being connected to the two transistors and a second diode terminal of each of the two diodes connected to the direct current bus.

6. The power supply system according to claim 1, wherein the third switch comprises two transistors and four diodes, the two transistors and a first diode and a second diode of the four diodes being connected in series and being connected in parallel with a third diode and a fourth diode of the four diodes.

7. The power supply system according to claim 1, wherein, in the line mode and in the battery mode, the fourth switch and the fifth switch are switched on, and wherein, in the alternating current out of limit mode, the fourth switch and the fifth switch are switched off.

8. A power supply system, comprising:

an input terminal configured to receive an alternating current input;

an output terminal configured to be connected to a load;

a first switch, a second switch, and a third switch;

a rectification and charging-discharging module comprising a first terminal, a second terminal, and a third terminal, wherein the first terminal is coupled to the input terminal through the first switch, and wherein the third terminal is configured to be coupled to a battery through the third switch;

a conversion module with a fourth terminal and a fifth terminal, wherein the fourth terminal is coupled to the second terminal of the rectification and charging-discharging module via a direct current bus, and the fifth terminal is coupled to the output terminal; and a bypass module comprising a sixth terminal and a seventh terminal, wherein the sixth terminal is coupled to the input terminal, and the seventh terminal is coupled to the output terminal through the second switch, wherein the power supply system is configured to operate in one of a line mode, a battery mode, or an alternating current out of limit mode by switching the first switch, the second switch, and the third switch on or off;

wherein, in the line mode, the first switch is switched off, and the second switch and the third switch are switched on;

wherein, in the battery mode, the first switch and the second switch are switched off, and the third switch is switched on;

wherein, in the alternating current out of limit mode, the first switch is switched on, and the second switch and the third switch are switched off;

wherein, in a state in which the load is connected to the output terminal and the battery is connected to the third terminal:

in the line mode, the bypass module is configured to operate and supply power to the load, the conversion module is configured to rectify an alternating current or voltage received from the bypass module and charge the direct current bus, and the direct current bus is configured to charge the battery through the rectification and charging-discharging module;

in the battery mode, the bypass module is disabled, the rectification and charging-discharging module is configured to discharge the battery, and the conversion module is configured to convert a direct current or voltage received from the rectification and charging-discharging module into an alternating current or voltage; and in the alternating current out of limit mode, the bypass module is disabled, the rectification and charging-discharging module is configured to rectify an alternating current or voltage received via the input terminal, and the conversion module is configured to convert a direct current or voltage received from the rectification and charging-discharging module into an alternating current or voltage;

wherein the rectification and charging-discharging module comprises two first switch units configured to be coupled to the battery such that the battery is coupled between the two first switch units; and wherein the conversion module comprises two second switch units coupled, respectively, to the two first switch units of the rectification and charging-discharging module.

9. The power supply system according to claim 8, wherein:

in the line mode and the battery mode, the two first switch units of the rectification and charging-discharging module are configured to be coupled between one of a positive electrode and a negative electrode of the battery and the direct current bus, respectively, and in the alternating current out of limit mode, the two first switch units of the rectification and charging-discharging module are connected in parallel.

10. The power supply system according to claim 8, further comprising a fourth switch, wherein a positive electrode of the battery is coupled between the two first switch units of the rectification and charging-discharging module through the third switch, and a negative electrode of the battery is coupled between the two first switch units of the rectification and charging-discharging module through the fourth switch.

11. The power supply system according to claim 10, wherein:

each of the two first switch units of the rectification and charging-discharging module comprises three transistors and one diode, a second transistor and a third transistor of the three transistors are connected in reverse series, a first transistor terminal of a first transistor of the three transistors and a first diode terminal of the diode being connected to the second transistor, and a second transistor terminal of the first transistor and a second diode terminal of the diode being connected to the direct current bus, and the positive electrode and the negative electrode of the battery are respectively coupled to a cathode of the diode of a first one of the two first switch units of the rectification and charging-discharging module and an anode of the diode of a second one of the two first switch units of the rectification and charging-discharging module.

12. The power supply system according to claim 10, wherein each of the two first switch units of the rectification and charging-discharging module comprises four transistors and two diodes, wherein a first transistor, a second transistor and a third transistor of the four transistors and a first diode of the two diodes being connected in series, and a fourth transistor of the four transistors and a second diode of the two diodes being connected in series and being connected in parallel with the second transistor and the third transistor, and wherein the positive electrode and the negative electrode of the battery are respectively coupled between a cathode of the second diode of a first one of the two first switch units of the rectification and charging-discharging module and an anode of the second diode of a second one of the two first switch units of the rectification and charging-discharging module.

13. The power supply system according to claim 10, wherein each of the two first switch units of the rectification and charging-discharging module comprises three transistors and three diodes, wherein a first transistor, a second transistor and a third transistor of the three transistors and a first diode of the three diodes being connected in series, and a second diode and a third diode of the three diodes being connected in series and being connected in parallel with the second transistor and the third transistor, and wherein the positive electrode and the negative electrode of the battery are respectively coupled between an intermediate node between the second transistor and the third transistor of a first one of the two first switch units of the rectification and charging-discharging module and an intermediate node between the second transistor and the third transistor of a second one of the two first switch units of the rectification and charging-discharging module.

14. The power supply system according to claim 10, wherein:

each of the two first switch units of the rectification and charging-discharging module comprises two transistors connected in series, the battery being coupled between intermediate nodes between respective two transistors of the two first switch units of the rectification and charging-discharging module, or each of the two first switch units of the rectification and charging-discharging module comprises a transistor and a diode connected in series, a positive electrode and a negative electrode of the battery being coupled, respectively, between a cathode of the diode of a first one of the two first switch units of the rectification and charging-discharging module and an anode of the diode of a second one of the two first switch units of the rectification and charging-discharging module.

15. A power supply system, comprising:

an input terminal configured to receive an alternating current input;

an output terminal configured to be connected to a load;

a first switch, a second switch, and a third switch;

a rectification and charging-discharging module comprising a first terminal, a second terminal, and a third terminal, wherein the first terminal is coupled to the input terminal through the first switch, and wherein the third terminal is configured to be coupled to a battery through the third switch;

a conversion module with a fourth terminal and a fifth terminal, wherein the fourth terminal is coupled to the second terminal of the rectification and charging-discharging module via a direct current bus, and the fifth terminal is coupled to the output terminal; and a bypass module comprising a sixth terminal and a seventh terminal, wherein the sixth terminal is coupled to the input terminal, and the seventh terminal is coupled to the output terminal through the second switch, wherein the power supply system is configured to operate in one of a line mode, a battery mode, or an alternating current out of limit mode by switching the first switch, the second switch, and the third switch on or off;

wherein, in the line mode, the first switch is switched off, and the second switch and the third switch are switched on;

wherein, in the battery mode, the first switch and the second switch are switched off, and the third switch is switched on;

wherein, in the alternating current out of limit mode, the first switch is switched on, and the second switch and the third switch are switched off;

wherein, in a state in which the load is connected to the output terminal and the battery is connected to the third terminal:

in the line mode, the bypass module is configured to operate and supply power to the load, the conversion module is configured to rectify an alternating current or voltage received from the bypass module and charge the direct current bus, and the direct current bus is configured to charge the battery through the rectification and charging-discharging module;

in the battery mode, the bypass module is disabled, the rectification and charging-discharging module is configured to discharge the battery, and the conversion module is configured to convert a direct current or voltage received from the rectification and charging-discharging module into an alternating current or voltage; and in the alternating current out of limit mode, the bypass module is disabled, the rectification and charging-discharging module is configured to rectify an alternating current or voltage received via the input terminal, and the conversion module is configured to convert a direct current or voltage received from the rectification and charging-discharging module into an alternating current or voltage;

wherein the rectification and charging-discharging module comprises a first switch unit, a second switch unit, and a third switch unit that are connected, respectively, to three phases of the alternating current input;

wherein the conversion module comprises three switch units coupled, respectively, to the first switch unit, the second switch unit, and the third switch unit of the rectification and charging-discharging module via the direct current bus; and wherein the bypass module comprises three switches connected, respectively, to the three phases.

16. The power supply system according to claim 15, further comprising a fourth switch, wherein a positive electrode of the battery is coupled to the first switch unit of the rectification and charging-discharging module through the third switch, and a negative electrode of the battery is coupled to the second switch unit of the rectification and charging-discharging module through the fourth switch.

17. The power supply system according to claim 16, wherein each of the first switch unit and the second switch unit comprises three transistors and one diode, wherein a second transistor and a third transistor of the three transistors being connected in reverse series, wherein a first transistor terminal of a first transistor of the three transistors and one terminal of the diode being connected to the second transistor, and the other terminal of the first transistor and the other terminal of the diode being connected to the direct current bus, the positive electrode of the battery being coupled to a cathode of the diode of one of the first switch unit and the second switch unit, and the negative electrode of the battery being coupled to an anode of the diode of the other one of the first switch unit and the second switch unit, wherein the third switch unit comprises two transistors connected in reverse series, and two diodes, and wherein a first diode terminal of each of the two diodes being connected to the two transistors and a second diode terminal of each of the two diodes connected to the direct current bus.

18. The power supply system according to claim 16, wherein each of the first switch unit and the second switch unit comprises four transistors and two diodes, wherein a first transistor, a second transistor and a third transistor of the four transistors and a first diode of the two diodes being connected in series, and a fourth transistor of the four transistors and a second diode of the two diodes being connected in series and connected in parallel with the second transistor and the third transistor, wherein the positive electrode of the battery being coupled to a cathode of the diode of a first one of the first switch unit and the second switch unit, and the negative electrode of the battery being coupled to an anode of the diode of a second one of the first switch unit and the second switch unit, and wherein the third switch unit comprises two transistors and four diodes, the two transistors and a first diode and a second diode of the four diodes being connected in series and being connected in parallel with a third diode and a fourth diode of the four diodes that are connected in series.

19. The power supply system according to claim 16, wherein each of the first switch unit and the second switch unit comprises three transistors and three diodes, wherein a first transistor, a second transistor, and a third transistor of the three transistors and a first diode of the three diodes being connected in series, and a second diode and a third diode of the three diodes being connected in series and being connected in parallel with the second transistor and the third transistor, wherein the positive electrode and the negative electrode of the battery being coupled between intermediate nodes between the respective second and third transistors of the first switch unit and the second switch unit, and wherein the third switch unit comprises two transistors and four diodes, the two transistors and a first diode and a second diode of the four diodes being connected in series and being connected in parallel with a third diode and a fourth diode of the four diodes.

20. The power supply system according to claim 16, wherein:

each of the first switch unit, the second switch unit, and the third switch unit comprises two transistors connected in series, the battery being coupled between an intermediate node between the two transistors of the first switch unit and an intermediate node between the two transistors of the second switch unit, or each of the first switch unit and the second switch unit comprises a transistor and a diode connected in series, and the third switch unit comprises two diodes connected in series, the positive electrode of the battery being coupled to a cathode of the diode of a first one of the first switch unit and the second switch unit, and the negative electrode of the battery being coupled to an anode of the diode of a second one of the first switch unit and the second switch unit.

21. The power supply system according to claim 16, wherein the first switch unit is connected to a first phase of the three phases of the alternating current input, the second switch unit is connected to a second phase of the three phases, and the third switch unit is connected to a third phase of the three phases, wherein the rectification and charging-discharging module further comprises a fourth switch unit connected to the first phase, a fifth switch unit connected to the second phase, and a sixth switch unit connected to the third phase, wherein the power supply system comprises three batteries, a first battery of the three batteries being coupled between the first switch unit and the fourth switch unit or the fifth switch unit, a second battery of the three batteries being coupled between the second switch unit and the fifth switch unit or sixth switch unit, and a third battery of the three batteries being coupled between the third switch unit and the sixth switch unit or the fourth switch unit, and wherein the conversion module further comprises three further switch units respectively coupled to the fourth switch unit, the fifth switch unit, and the sixth switch unit of the rectification and charging-discharging module via the direct current bus.

22. The power supply system according to claim 15, wherein each of the three switches of the bypass module comprises two thyristors connected in reverse parallel.

23. A method of operating a power supply system, the method comprising:

detecting at least one of a voltage, a current, or a frequency at an input terminal or an output terminal of the power supply system;

determining that the power supply system operates in one of a line mode, a battery mode, or an alternating current out of limit mode based on at least one of the detected voltage, current, or frequency;

providing the power supply system with a control signal for switching off a first switch and switching on a second switch and a third switch, based on determining that the power supply system operates in the line mode;

providing the power supply system with a control signal for switching off the first switch and the second switch and switching on the third switch, based on determining that the power supply system operates in the battery mode;

providing the power supply system with a control signal for switching on the first switch and switching off the second switch and the third switch, based on determining that the power supply system operates in the alternating current out of limit mode;

selectively connecting a positive electrode of a battery to the first switch through a fourth switch; and selectively connecting a negative electrode of the battery to the second switch through a fifth switch.

24. The method of claim 23, wherein, in the line mode and in the battery mode, the fourth switch and the fifth switch are switched on, and wherein, in the alternating current out of limit mode, the fourth switch and the fifth switch are switched off.

* * * * *